United States Patent [19]

Weber

[11] 4,152,765
[45] May 1, 1979

[54] PROGRAMMER UNIT FOR N/C SYSTEMS

[76] Inventor: John M. Weber, 630 Colgate Rd., Washington County, Colgate, Wis. 53017

[21] Appl. No.: 833,509

[22] Filed: Sep. 15, 1977

[51] Int. Cl.² .............................................. G05B 19/42
[52] U.S. Cl. .................................... 364/474; 318/568; 364/107; 364/120
[58] Field of Search ............... 364/107, 118, 120, 474; 318/567, 568, 569, 570

[56] References Cited

U.S. PATENT DOCUMENTS

| | | | |
|---|---|---|---|
| 3,828,318 | 8/1974 | Bennett et al. | 318/568 X |
| 3,857,025 | 12/1974 | English et al. | 364/107 X |
| 4,010,356 | 3/1977 | Evans et al. | 318/568 X |
| 4,042,866 | 8/1977 | Morita et al. | 318/568 |

Primary Examiner—Joseph F. Ruggiero
Attorney, Agent, or Firm—Quarles & Brady

[57] ABSTRACT

A programmer unit includes a keyboard through which an operator may enter data which is responsive to questions displayed on an alpha-numeric display. The programmer automatically leads the operator through a series of steps in which a part is defined as a series of composites and stored in an (L) array. This definition of the part is then converted to a series of move commands which are stored sequentially in an (O) array. Cutter offset and machine codes are added to the data stored in the (O) array to form a part program which may be read out and stored on punched tape or magnetic tape.

13 Claims, 21 Drawing Figures

Fig. 17

| ROW NUMBER (R) | COLUMN NUMBER (C) | | | | | | |
|---|---|---|---|---|---|---|---|
| | 1 | 2 | 3 | 4 | 5 | 6 | 7 |
| | COMPOSITE NUMBER | X DIMENSION | Y DIMENSION | RADIUS DIMENSION ($R_1$) | RADIUS DIMENSION ($R_2$) | RADIUS DIMENSION ($R_3$) | ROTATIONS CW=1 CCW=2 |
| 1 | II | | | | | | |
| 2 | IV | | | | | | |
| 3 | III | | | | | | |
| 4 | II | | | | | | |
| 5 | III | | | | | | |
| 6 | II | | | | | | |
| 7 | 0 | | | | | | |
| ⋮ | | | | | | | |
| n | | | | | | | |

Fig. 18

| | 1 | 2 | 3 | 4 | 5 |
|---|---|---|---|---|---|
| | MOVE CODE (G) | ABSOLUTE X-AXIS VALUE | ABSOLUTE Y-AXIS VALUE | ABSOLUTE I VALUE | ABSOLUTE J VALUE |
| 1 | | | | | |
| 2 | | | | | |
| 3 | | | | | |
| 4 | | | | | |
| 5 | | | | | |
| ⋮ | | | | | |
| n | | | | | |

(O) ARRAY COLUMN NUMBER (O) ARRAY ROW NUMBER

PROGRAMMER UNIT FOR N/C SYSTEMS

BACKGROUND OF THE INVENTION

The field of the invention is numerically controlled machine tools, and more particularly, the development of part programs for numerical control systems on such machine tools.

Numerical control systems direct machine tools such as milling and drilling machines through a series of moves to machine a part. The desired series of moves form a part program which is input to the numerical control system. Such part programs may be stored on a magnetic or punched tape or they may be coupled through a communication link from a host computer in a DNC system. The format and coding of part programs for use on commercially available numerical control systems is standardized and thus as a practical matter a machine for developing such a part program must generate its work product in one of the standard forms.

Prior systems for generating part programs are expensive, time consuming and require the skills of a trained computer programmer. Such systems employ high level languages such as APT or UNIAPT to define the part which is to be machined. The operator must be skilled in the use of the language in order to formulate the statements which properly define the geometry. Following this, the developed program must be preprocessed and then post processed to convert the statements into a standard part program format and code. Such processing usually requires the use of a large general purpose digital computer which is expensive and which may involve considerable time. If an error is made, or if changes in the program are desired, the entire process usually must be repeated.

Prior systems for generating part programs are particularly impractical for small machine shops which cannot justify the cost of a general purpose digital computer or the hiring of a skilled programmer. As a result, the use of numerically controlled machine tools at such establishments has been limited. Also, even when the equipment and skilled programmer are present, the cost and time required to generate a part program may more than offset the advantages of making the part on a numerically controlled machine. This is often the case when only a few of the same part are to be made, in which case it is more practical to employ a manually operated machine.

SUMMARY OF THE INVENTION

The present invention relates to a programmer unit for interactively developing a part program for a numerical control system. More specifically, the programmer unit includes a keyboard and display for interfacing with an operator; means for storing an (L) array and an (O) array; a plurality of selectable composite definition means, each associated with a unique geometric shape and including means for outputting data to the display and inputting responsive data from the keyboard, which inputted data includes a set of dimensions that define the associated unique geometric shape; and means for storing the set of dimensions in the (L) array along with its associated composite number.

A definition of the geometric shape of the part is formed by a series of composite numbers and their associated dimensions which are stored in the (L) array. This geometric definition is converted to a part program by selectable composite processor means which is responsive to the composite numbers stored in the (L) array. The composite processor means converts a set of dimensions stored in the (L) array to sets of elements stored in the (O) array which define one or more moves to be made by a machine tool to form the part. The contents of the (O) array can be outputted directly to the numerical control system on a machine tool or it can be stored on punched or magnetic tape for later use.

An underlying concept of the present invention is that most parts which are machined with numerically controlled machine tools can be viewed as a series of relatively simple concatenated geometric shapes. It is another aspect of the invention, however, that certain of such geometric shapes can be readily defined by dimensions which are commonly available on drawings of parts to be machined. Each of the composite definition means in the invented programmer unit is associated with one of such geometric shapes and when one is selected by the operator, the programmer unit requests the operator to input the set of dimensions, or parameters, necessary to specifically define the selected geometric shape. Such dimensions may be, for example, the end point of a straight line segment, the center and radii of circular arcs, or merely the radii of a circular arc. The part can thus be constructed of a series of selected geometric shapes and each of these geometric shapes may be precisely defined by readily available information.

The resulting definition of the part is stored in the (L) array and the programmer unit then automatically selects and employs the appropriate composite processor means to calculate the elements of a series of moves which will machine the part. Such moves may include a straight line from the present position of the machine tool to an end point defined by X and Y coordinate values, or it may include a circular move about a center defined by X and Y coordinates to an end point defined by X and Y coordinates. The elements of the series of moves which define the entire part to be machined are stored in the (O) array and in some cases this data may be employed directly to control the machine. More typically, however, the move elements are recalculated to include cutter offset.

A general object of the invention is to facilitate the development of part programs for numerically controlled machines. Because the programmer unit interacts with the operator and guides him through the steps of developing the part program, highly trained operators are not necessary. The programmer unit interrogates the operator as to which composite number is to be selected next, and when selected, the programmer sequentially indicates to the operator which dimensions must be entered to define the selected geometric shape.

Another general object of the invention is to provide a means for rapidly developing a part program. Most parts are easily broken down into a series of geometric shapes which are recognized by the programmer unit. The operator selects the composite number associated with each of the geometric shapes and enters the requested dimensions. In a matter of seconds the programmer unit automatically calculates the elements of the (O) array from the elements of the (L) array and then, if desired, the part program can be tested on an X-Y plotter. If needed, cutter offset can be entered and the programmer unit automatically recalculates the elements of the (O) array to take this into consideration.

The foregoing and other objects and advantages of the invention will appear from the foregoing description. In the description reference is made to the accompanying drawings which form a part hereof, and in which there is shown by way of illustration a preferred embodiment of the invention. Such embodiment does not necessarily represent the full scope of the invention, however, and reference is made to the claims herein for interpreting the breadth of the invention.

BRIEF DESCRIPTION OF THE DRAWINGS

FIG. 17 is a schematic representation of the (L) array which is stored in the programmer of FIG. 2, FIG. 18 is a schematic representation of the (O) array which is stored in the programmer of FIG. 2.

DESCRIPTION OF THE PREFERRED EMBODIMENT

Figure 1:
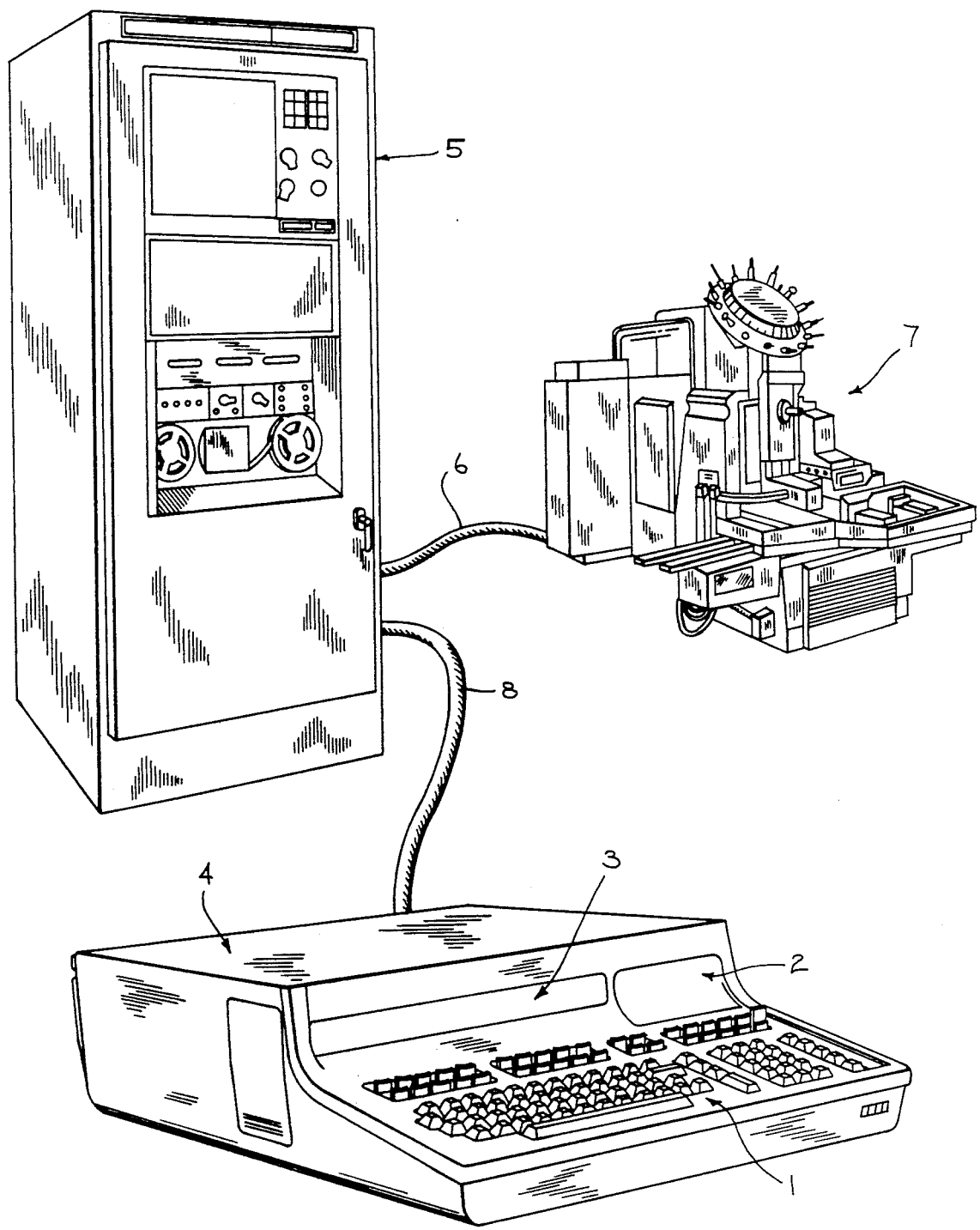
FIG. 1 is a perspective view of the invented programmer connected to a numerical control system.

Referring to FIG. 1, the numerical control programmer unit includes a keyboard unit 1 for entering information into and controlling the operation of the programmer. It also includes a magnetic tape cassette unit 2 for recording information stored in the programmer and for loading recorder information into the programmer. The programmer unit also includes a solid state output display unit 3 which provides visual indication of alpha-numeric data stored within the programmer. All of these elements are contained within a single housing 4 which may be easily transported to a selected site.

The numerical control programmer unit may, for example, connect to the DNC interface terminal on a numerical control system 5 through a cable 8. The program developed with the use of the programmer unit may thus be directly transferred to the numerical control system 5 which uses it to control a multi-axis machine tool 7 through a cable 6. As will be described in more detail hereinafter, other input and output devices may be connected to the programmer unit to input data thereto and to store the program which is developed. The developed program may be stored on punched tape, for example, which may be used on the tape reader of most commercially available numerical control systems.

Figure 2:
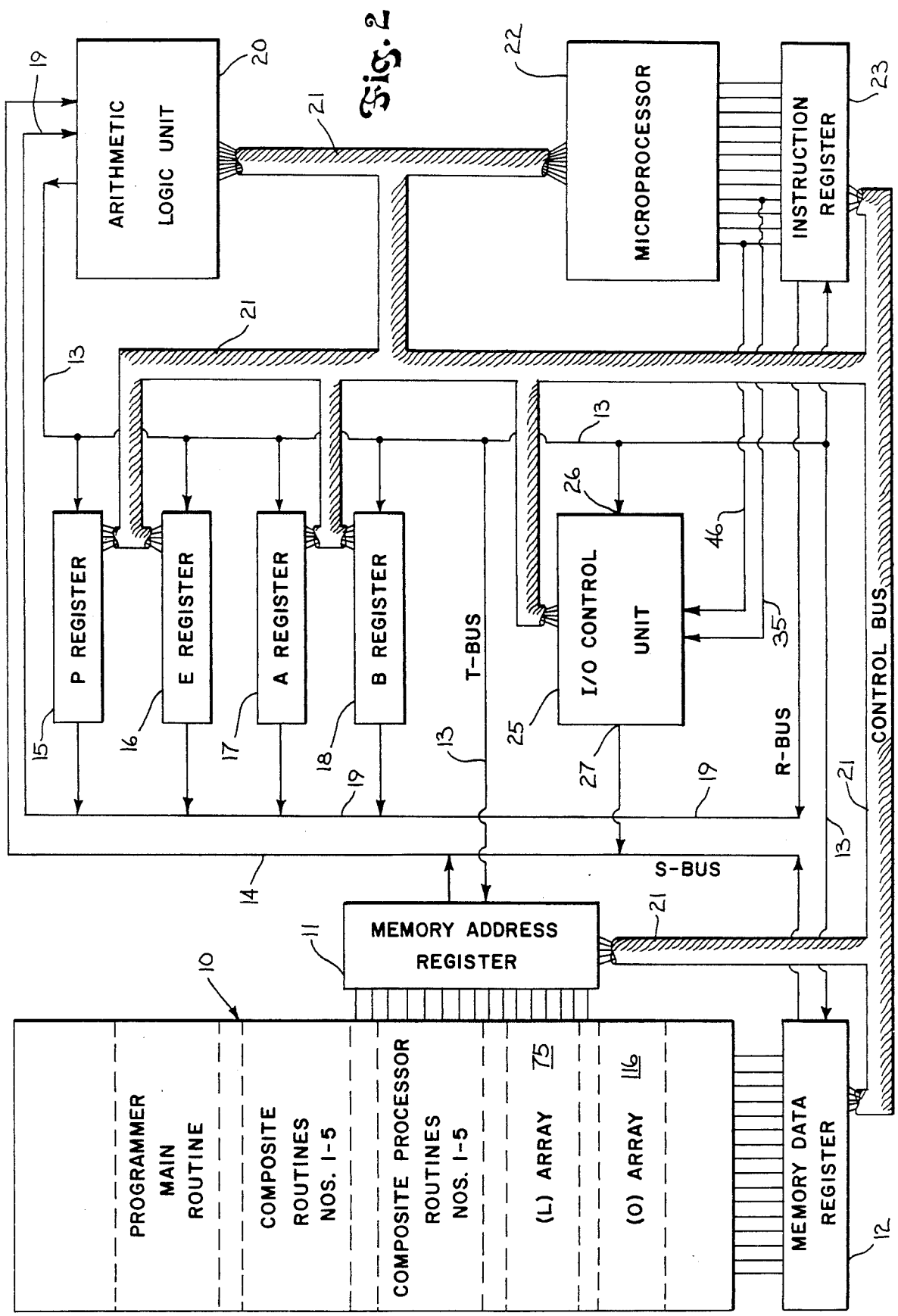
FIG. 2 is an electrical block diagram of the programmer.

Referring to FIG. 2, the programmer unit operates in response to instructions stored in a memory 10. The memory 10 is an MOS-type semiconductor memory which stores 16-bit words that are separately addressable through a memory address register 11. The addressed word in the memory 10 may be read out and stored in a 16-bit memory data register 12, or conversely, a 16-bit word in the memory data register 12 may be written into an addressed line of the memory 10. The registers 11 and 12 are recirculating 16-bit serial shift registers each having a serial input terminal connected to a T-bus 13 and each having a serial output terminal connected to an S-bus 14. Data is coupled between the memory 10 and the other elements of the programmer through the T-bus 13 and the S-bus 14.

The programmer also includes four registers which connect to the T-bus 13 and an R-bus 19. These are identified as the P register 15, the E register 16, the A register 17 and the B register 18. The P, A and B registers are recirculating 16-bit serial shift registers having their serial inputs connected to the T-bus 13 and their serial outputs connected to the R-bus 19. The E register 16 is a four-bit shift register having its input connected to the T-bus 13 and its output connected to the R-bus 19. The P register 15 serves as the program counter and the A and B registers 17 and 18 serve as the accummulator registers. The E registers serves as a serial extend register.

The T-bus 13, the S-bus 14 and the R-bus 19 connect to an arithmetic logic unit 20. The arithmetic logic unit 20 performs one-bit serial binary arithmetic on data received through the S-bus 14 or data received through the R-bus 19 and it may also perform logic operations on data received through the buses 14 and 19. The arithmetic and logic operations performed by the arithmetic logic unit 20 are determined by microinstructions which are received through a control bus 21 from a microprocessor 22. Results of arithmetic or logical operations performed by the arithmetic and logic unit 20 are transferred serially through the T-bus 13 to any one of the above described registers.

The operation of all elements in the programmer is determined by microinstructions generated on the control bus 21 by the microprocessor 22. The microprocessor 22 is in turn responsive to 16-bit macroinstructions which are stored in an instruction register 23. The instruction register 23 is a recirculating 16-bit shift register having its serial input connected to the T-bus 13 and its serial output connected to the R-bus 19. Its sixteen parallel output terminals connect to the microprocessor 22.

A basic machine operation consists of loading the contents of the P register 15 into the memory address register 11 and reading the macroinstruction on the addressed memory line out of the memory 10 and into the memory data register 12. The macroinstruction is then shifted to the instruction register 23 where it is applied to the microprocessor 22. The microprocessor 22 responds by issuing a series of microinstructions on the control bus 21 which operate the system elements to carry out the functions indicated by the macroinstruction. After the macroinstruction is executed, the program counter (P register 15) is incremented and the cycle repeats to execute the next macroinstruction. For a more detailed description of the structure of the programmer unit and the manner in which it operates to execute instructions, reference is made to U.S. Pat. No.

4,012,725 which issued on Mar. 15, 1977 and is entitled "Programmable Calculator."

Figure 3:
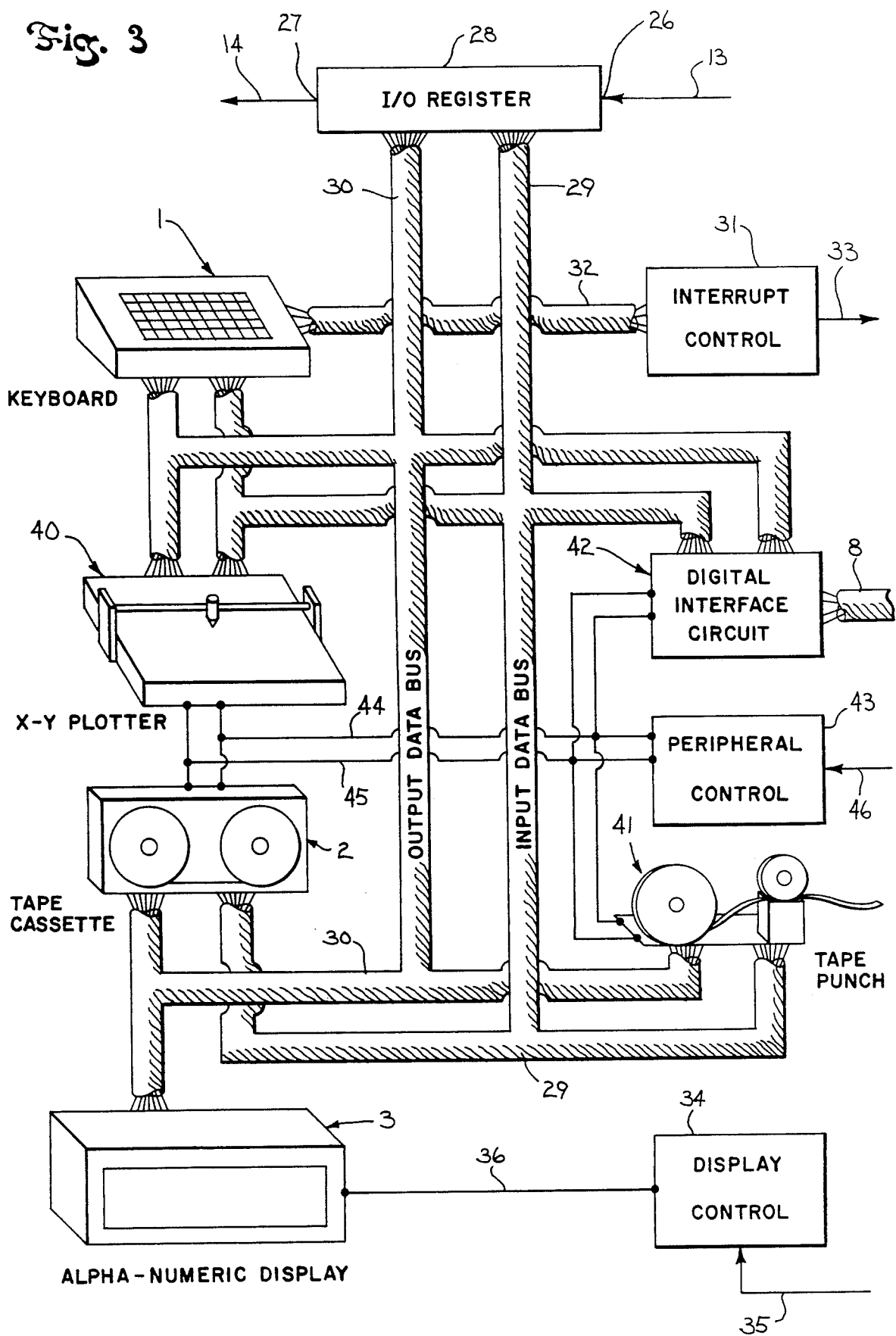
FIG. 3 is an electrical block diagram of the I/O control unit which forms part of the programmer of FIG. 2.

Data is coupled to and from the various I/O devices associated with the programmer through an I/O control unit 25. Referring particularly to FIGS. 2 and 3, the I/O control unit 25 has a serial input 26 which receives output data from the T-bus 13 and a serial output terminal 27 which connects to the S-bus 14. The input terminal 26 and the output terminal 27 are associated with a universal 16-bit I/O shift register 28 into which data may be transferred either bit-serially from the T-bus 13 or in parallel from an input data bus 29. Data may be transferred from the I/O register 28 either bit-serially to the S-bus 14 or in parallel to an output data bus 30.

The input data bus 29 and the output data bus 30 couple to a variety of I/O devices. Both buses 29 and 30 connect to the keyboard 1 and the tape cassette 2 and the output data bus 30 couples to the alpha-numeric display 3. Other peripheral devices including an X-Y plotter 40, a tape punch 41 and a digital interface circuit 42 connect to the input data bus 29 and the output data bus 30.

An interrupt control circuit 31 is connected to the keyboard 1 through a cable 32 and when a key is depressed, an interrupt request signal is generated through a lead 33 to the microprocessor 22. At the completion of the macroinstruction then being executed, the microprocessor 22 calls up an interrupt service routine stored in the memory 10. The interrupt service routine inputs the character from the keyboard 1 and then returns to the interrupted routine.

Associated with the alpha-numeric display 3 is a display control circuit 34 which has an input connected through a lead 35 to the fourth-bit output terminal on the instruction register 23. The display control circuit 34 connects to the alpha-numeric display 3 through a lead 36 and when data is to be outputted to the alpha-numeric display 3, it is enabled by the display control circuit 34. Such an operation is performed in response to an I/O macroinstruction stored in the instruction register 23. The I/O macroinstruction includes an operation code which indicates that data is to be outputted to the alpha-numeric display 3 and an operand which identifies the source of data to be outputted. The microprocessor 22 responds by generating microinstructions through the control bus 21 which couple the identified data through the T-bus 13 into the I/O register 28 and then on to the output data bus 30.

The digital interface circuit connects to the cable 8 which couples to the numerical control system 5 and it operates to provide an EIA-RS-232C compatible interface with the cable 8. Part program data developed with the use of the programmer unit may thus be coupled directly to the memory of the numerical control system 5 through the cable 8. This capability is particularly useful when the programmer is used in conjunction with numerical control systems which provide for the storage in their memory of entire part programs. The cable 8 may also connect to a digital printer or a host computer in a DNC system.

If direct coupling between the programmer unit and the numerical control system 5 is not desired, or not possible, the part program developed with the use of the programmer unit may be tested on the X-Y plotter 40 and then outputted to the tape punch 41. Operation of the tape cassette 2, X-Y plotter 40, tape punch 41 and digital interface circuit 42 is controlled by a peripheral control circuit 43 through a pair of control lines 44 and 45. The peripheral control circuit 43 connects through a lead 46 to the least significant digit output of the instruction register 23.

Figure 4:
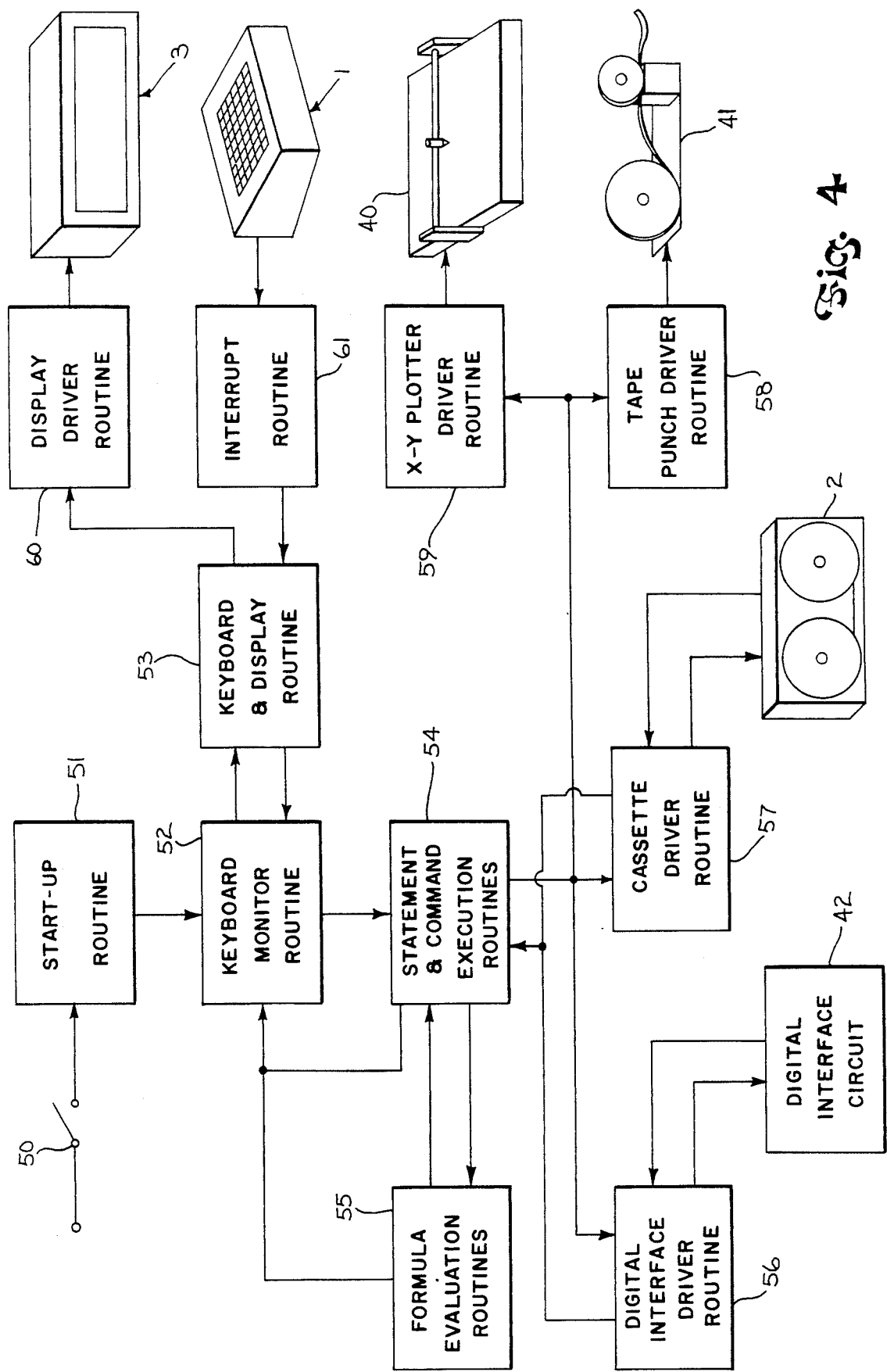
FIG. 4 is schematic diagram of the system software of the programmer of FIG. 1, FIGS. 5-13 are flow charts of the programmer main routine which is stored in a memory which forms part of the programmer of FIG. 2.

Referring to FIG. 4, the basic system software components of the programmer comprise routines which are stored in the memory 10. When an on-off switch 50 is turned on a start-up routine 51 is executed to initialize certain variables and pointers and after its completion, control is passed to a keyboard monitor routine 52. The keyboard monitor routine calls for input data from the keyboard and display routine 53, and when such data is received, it searches mnemonic tables stored in the memory 10 to ascertain the identity of the statement or system command. When the input data is identified the system jumps to the appropriate routine. A separate syntax analysis routine is provided for each possible statement and an execution routine is provided for each possible system command. These are indicated collectively by the block 54.

Several of the statement and command execution routines require evaluation of arithmetic functions and expressions which is performed by formula evaluation routines 55. Other statements and commands require input from or output to one or more of the I/O devices, and accordingly, driver routines 56-59 for the respective I/O devices 42, 2, 41 and 40 are provided. When a statement or system command has been executed, control is returned to the keyboard monitor routine 52.

The keyboard and display routine 53 periodically refreshes the display 3 through a display driver routine 60 and receives data from an interrupt routine 61. When a key on the keyboard 1 is depressed the interrupt control circuit 31 (FIG. 3) causes the system to jump to the interrupt routine 61. The interrupt routine 61 saves the keycode in a specified memory location and control is returned to the interrupted routine. The keyboard and display routine 53 reads this memory location and decides what operations need to be performed in response to that particular keycode. For a more detailed explanation of the basic system software, reference is made to the above-cited U.S. Pat. No. 4,012,725.

To better understand the functions performed by the programmer unit of the present invention a description of the part program development procedure will first be made. This description will be made with reference to the example part in FIGS. 14 and 16 and the composite chart in FIG. 15.

Figure 14:
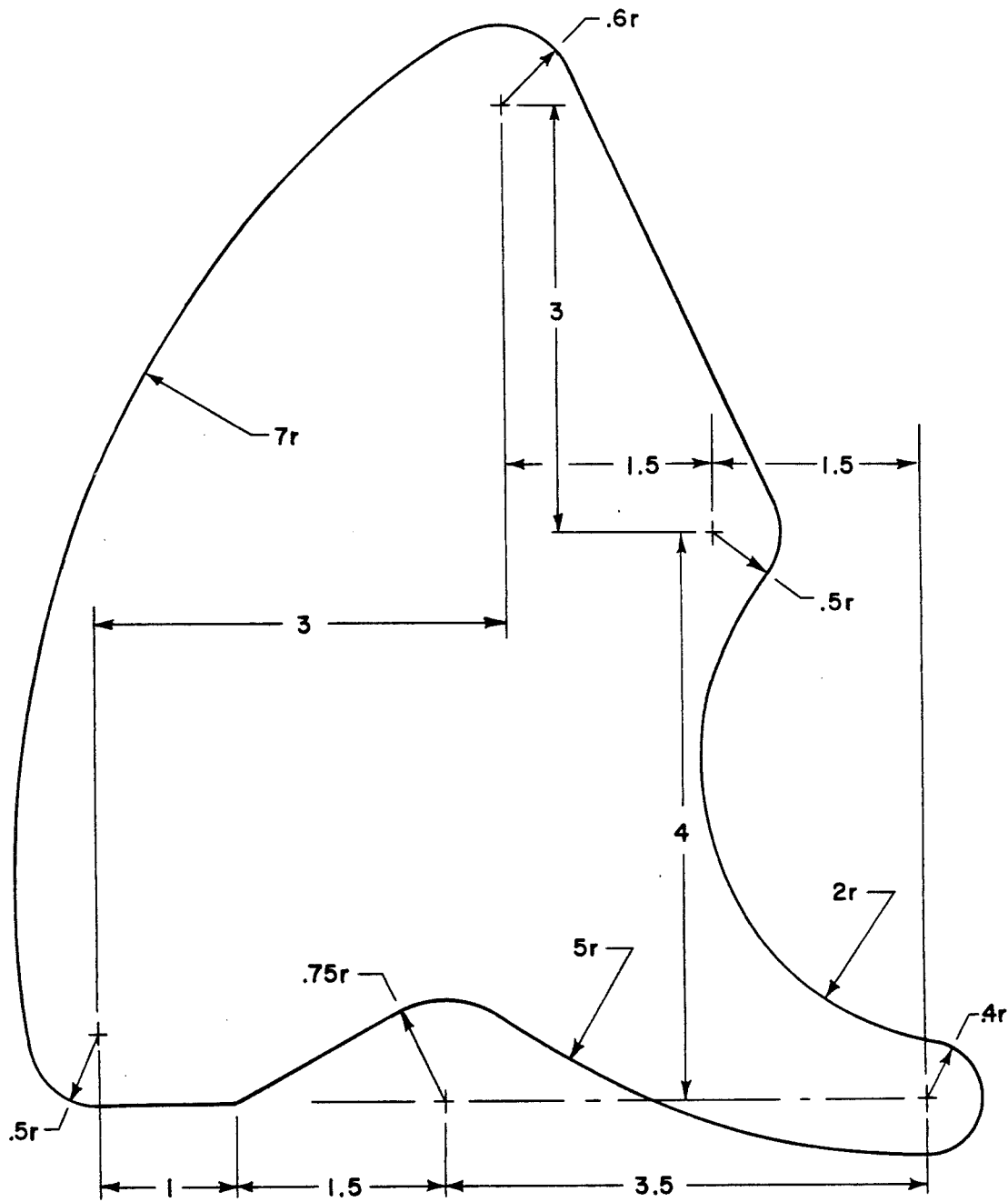
FIG. 14 is a drawing of an exemplary part for which a part program may be developed using the present invention.

As shown in FIG. 14, a typical part drawing is comprised of a series of straight lines and circular arcs which are concatenated to form its outline. If the starting point and end point of each straight line segment were given on the drawing along with the starting and end points of the circular arcs and their centers, the development of a part program for reproducing the illustrated part on a numerically controlled machine would be trivial. Such is never the case however. Instead, the geometry of the part is usually defined by the center points of circular arcs and their radii. The intersections of the circular arcs with each other and with straight line segments are usually not known.

Figure 15:
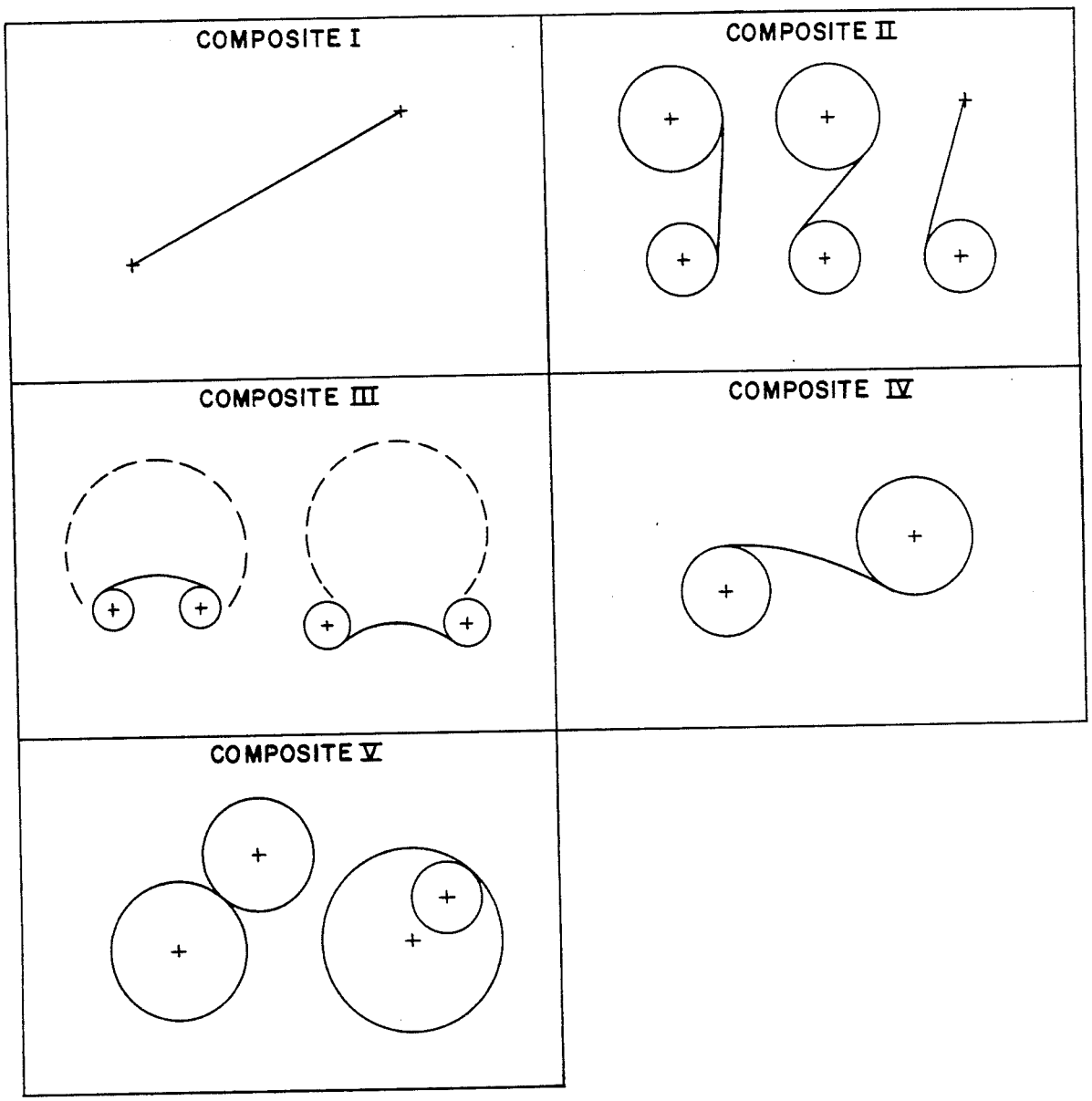
FIG. 15 is an illustration of the five composites which may be selected to define a part.

It is a discovery of the present invention that a vast majority of parts made on numerically controlled machines can be constructed by concatenating selected geometric shapes. The number of different geometric shapes needed to form the vast majority of parts are relatively few in number and these can be defined by the geometric dimensions which are commonly available on part drawings. These selected geometric shapes are referred to herein as "composites," and as shown in FIG. 15, the preferred embodiment of the invention described employs a set of five separate composites which are available to describe a part. These are identified hereinafter as composites I–V.

It should be apparent to those skilled in the art that the number of composites and their specific features may be varied. For example, if a class of geometric shapes is encountered quite often in certain applications, then additional composites may be added which will facilitate the development of part programs to reproduce such shapes. On the other hand, some of the composites shown in FIG. 15 may be eliminated. For example, composite No. I can be viewed as a special case of composite No. II in which the radii of the circles at each end are both zero. The choice and number of composites employed involves a trade-off between the convenience to the operator which additional composites provide versus the cost of adding the composite to the programmer unit.

Figure 16:
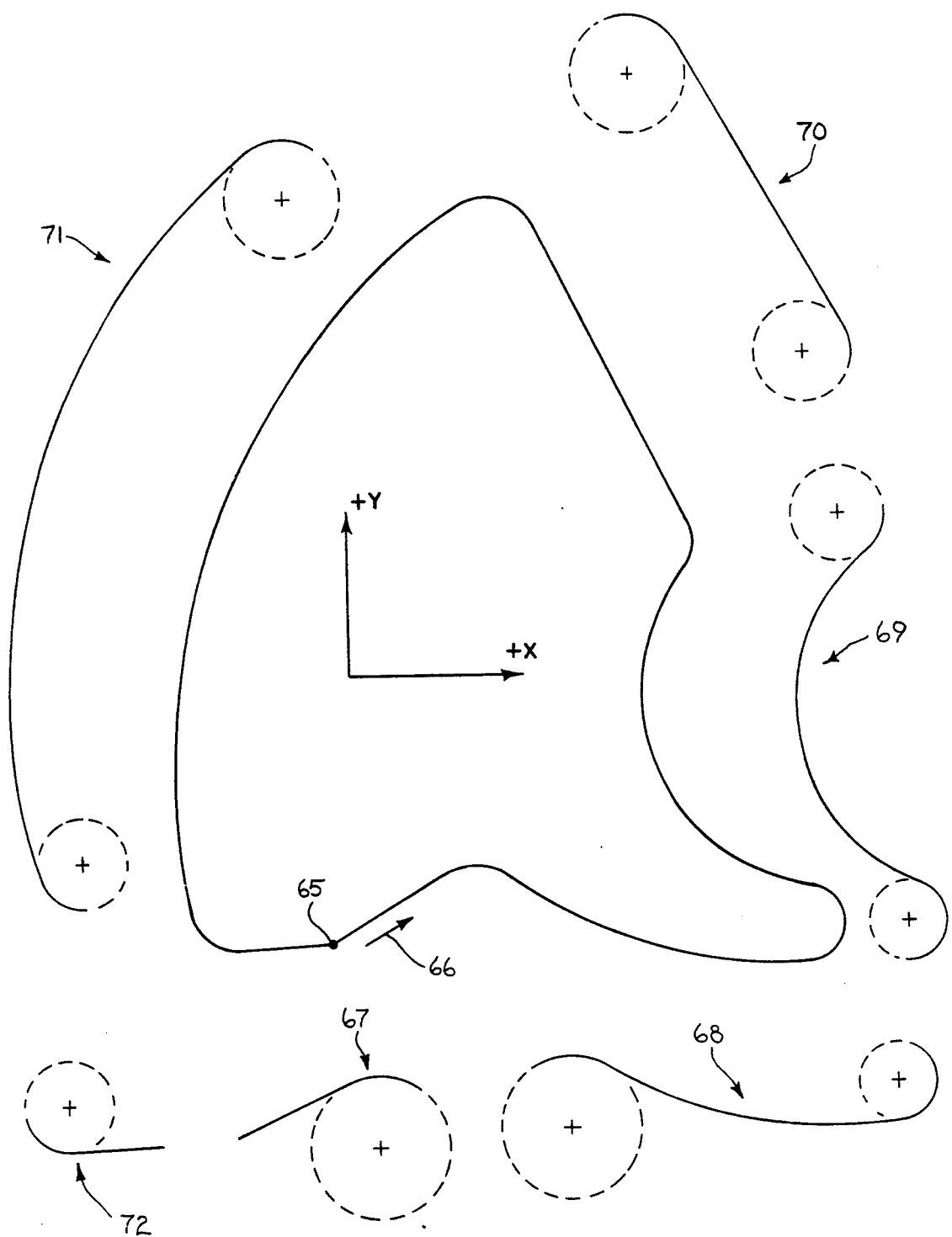
FIG. 16 is a schematic illustration of the example part of FIG. 14 broken into a series of the composites of FIG. 15.

Referring particularly to FIG. 16, the method implemented by the programmer unit of the present invention begins at a starting point 65 on the shape to be programmed and travels in the direction of the arrow 66 around its perimeter. The shape of the part as one travels around its perimeter may be described by a sequence of composites selected from the available set I–V. Thus the illustrated part may be described by the successive line segments 67–72, the last of which ends at the starting point 65. The successive line segments are formed from selected ones of the set of composites I–V as follows:

| Line Segment | Composite No. |
|---|---|
| 67 | II |
| 68 | IV |
| 69 | III |
| 70 | II |
| 71 | III |
| 72 | II |

Each composite No. I–V relates to a class of specific, but dimensionless geometric shapes. Having established that a segment of a part may be generally described by a particular composite, the task of specifically defining the line segment is reduced to the task of merely adding dimensions. This task is simplified because there are but a few dimensions, or parameters, needed to specify a shape from each of the composites I–V and all of these dimensions are readily available on typical engineering drawings. The set of parameters associated with each of the composites I–V are indicated in the following Table A.

TABLE A

| Composite No. | Parameters |
|---|---|
| I | X dimension between starting point and end of line. |
|  | Y dimension between starting point and end of line. |
| II | X dimension between center of first circle and center of second circle. |
|  | Y dimension between center of first circle and center of second circle. |
|  | ($R_1$) Radius of first circle. |
|  | ($R_2$) Radius of second circle. |
|  | Direction of travel on first circle [i.e. clockwise (cw) or counterclockwise (ccw)]. |
|  | Direction of travel on second circle [i.e. cw or ccw]. |
| III | X dimension between center of first circle and center of third circle. |
|  | Y dimension between center of first circle and center of third circle. |
|  | ($R_1$) Radius of first circle. |
|  | ($R_2$) Radius of second, or "connecting" circle. |
|  | ($R_3$) Radius of third circle. |
|  | Direction of travel on first circle [i.e. cw or ccw]. |
|  | Direction of travel on third circle [i.e. cw or ccw]. |
| IV | X dimension between center of first circle and center of third circle. |
|  | Y dimension between center of first circle and center of third circle. |
|  | ($R_1$) Radius of first circle. |
|  | ($R_2$) Radius of second, or "connecting" circle. |
|  | ($R_3$) Radius of third circle. |
|  | Direction of travel on first circle [i.e. cw or ccw]. |
|  | Direction of travel on second, or "connecting" circle, [i.e. cw or ccw]. |
| V | X dimension between center of first circle and center of second circle. |
|  | Y dimension between center of first circle and center of second circle. |
|  | ($R_1$) Radius of first circle. |
|  | ($R_2$) Radius of second circle. |
|  | Direction of travel on first circle [i.e. cw or ccw]. |
|  | Direction of travel on second circle [i.e. cw or ccw]. |

The programmer unit asks the operator to select a composite number by displaying a message on the alpha-numeric display 3. The appropriate composite definition means is thus selected and the programmer unit sequentially displays messages which request the operator to input the dimensions for the selected composite. The above parameters are thus entered by the operator through the keyboard 1 on the programmer unit and they are stored in an (L) array 75 within the memory 10 along with their associated composite number. The elements of the (L) array 75 are identified by the row (R) and column (C) in which they are located. The contents of the (L) array are indicated in FIG. 17 and it can be seen that each row (R) stores a composite number and its associated parameters. It should be apparent that not all elements in a given row (R) will be meaningful since the parameters associated with each type of composite I–V are different. For example, when composite No. I is specified in column 1, only X and Y dimensions in columns 2 and 3 are stored. The remaining elements in that row remain blank and serve no purpose. The contents of the (L) array 75 after the part shown in FIG. 14 has been completely described is illustrated in FIG. 17. A "zero" in column 1 of the (L) array 75 indicates the end of the part description.

The programmer unit of the present invention interacts with the operator to obtain the identity of the successive composites which form the part, and with respect to each selected composite, to obtain the dimensions which define the geometric shape. The sequence of events is controlled by a main routine which is stored in the memory 10 of the programmer. A flow chart of the main routine is shown in FIGS. 5–13 and the operation of the programmer will now be described with respect to this flow chart.

Figure 5:
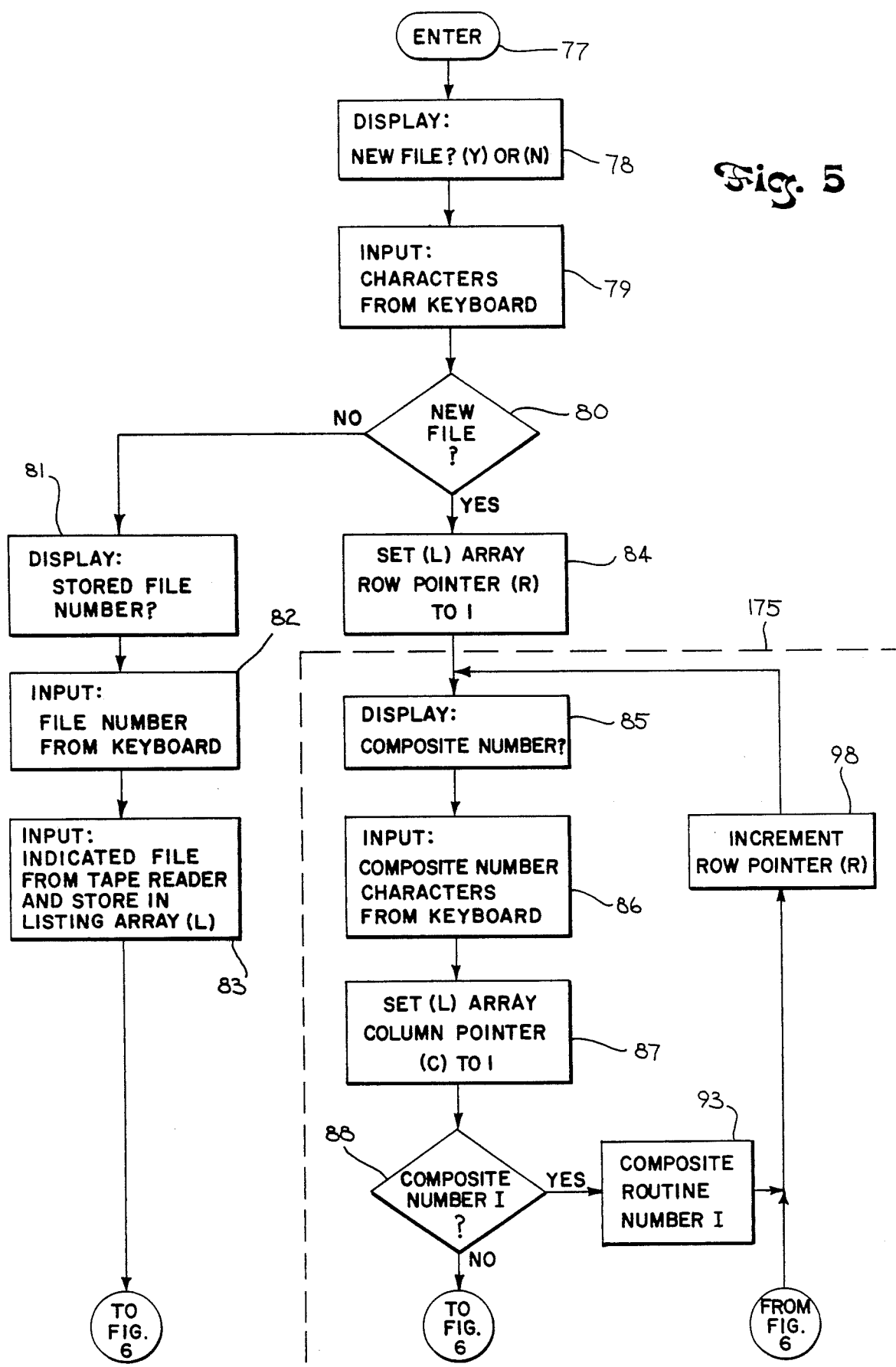

Referring particularly to FIG. 5, the main routine is entered at the point 77 and a first instruction indicated by a process block 78 outputs data to the alpha-numeric display 3 which asks the operator whether an existing part program data file is to be employed or whether a new part program data file is to be developed. An instruction indicated by a process block 79 inputs the operator's response (Y or N) and a branch is established by a decision block 80. If an existing part program file is desired, an instruction indicated by a process block 81 couples data to the alpha-numeric display 3 which asks the operator to identify the desired file number. Responsive data is then coupled from the keyboard 1 as indicated by the process block 82 and the indicated part program file is then read in from the tape cassette 2 and stored in the (L) array 75 of the memory 10 as indicated by the process block 83.

If a new part program file is to be developed, a branch does not occur at the decision block 80. Instead, preparation for the development of a part program data file in the (L) array 75 is begun by setting a row pointer (R) to "one" as indicated by a process block 84. As indicated by a process block 85 the operator is then asked to enter the identity of the first composite on the part to be described. The response from the operator is inputted from the keyboard 1 as indicated by the process block 86 and a column pointer (C) for the (L) array 75 is then set to "one" as indicated by the process block 87. The identity of the selected composite number is then determined by a set of instructions which are indicated by the successive decision blocks 88–92. Having identified the selected composite (I–V) a corresponding composite routine indicated by the respective process blocks 93–97 is executed. As will be described in more detail hereinafter, each composite routine displays a succession of messages to the operator which asks him to enter the dimensions needed to define the selected composite. The data thus entered is stored in the line of the (L) array 75 indicated by the row pointer (R) at the position indicated by the column pointer (C). After the selected composite has been completely described, the system loops back to an instruction indicated by the process block 98 which is executed to increment the row pointer (R). The system then repeats the process of identifying the next composite needed to define the boundary of the part. The system remains in this loop until the operator enters a "zero" for the composite number. As will be described in more detail hereinafter the functions performed in this loop which is defined in FIGS. 5 and 6 by the dashed line 175 are accomplished by a single routine which is identified as the "combined composite routine."

The (L) array 75 is thus filled with data which defines the part as a series of composite numbers and associated dimensions. After the last composite has been identified the operator enters the number "zero" in response to the question posed by the process block 85. The loop is then exited to a process block 99 shown in FIG. 6.

Sets of instructions indicated by the process block 99 and process blocks 100 and 101 are then executed to output the contents of the (L) array to the printer along with an X and Y parity indication. If the part has been properly described by the operator and the descriptive data properly stored in the (L) array 75, the starting point and end point in that description will have the same X and Y dimensions. If a discrepancy occurs it will be indicated as an X or Y parity which may be examined along with the contents of the (L) array 75 to determine where the error was made.

Figure 7:
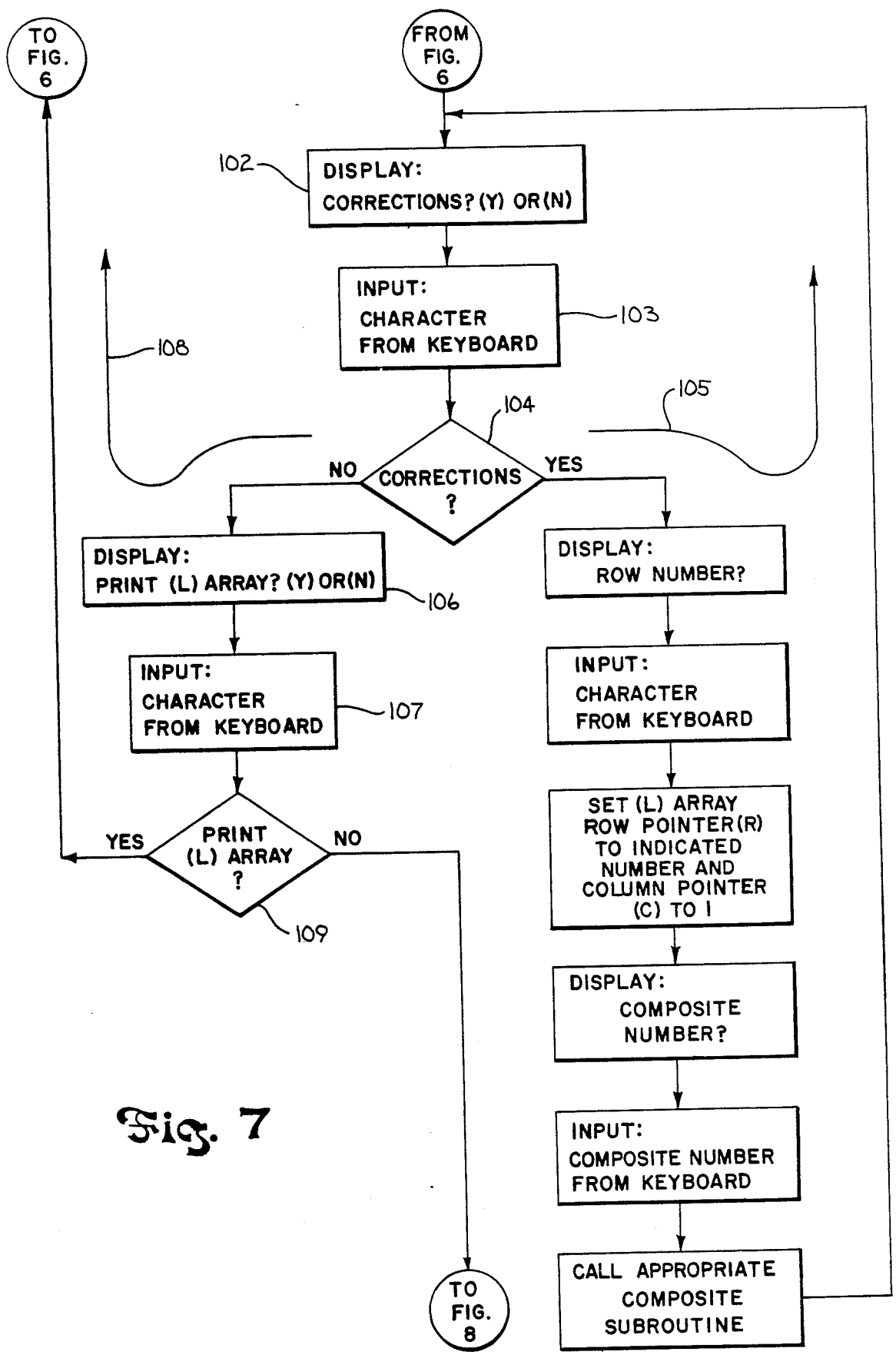

Referring to FIG. 7, the programmer unit includes an instruction indicated by a process block 102 which asks the operator through the display 3 to indicate whether or not the contents of the (L) array 75 are correct. The response is inputted from the keyboard 1 as indicated by a process block 103 and it is then evaluated by instructions indicated by decision block 104.

If corrections are to be made to the contents of the (L) array 75, a loop indicated by an arrow 105 is entered and the operator is asked which row (i.e. composite) is to be changed. The appropriate composite is selected by the operator and the corresponding composite routine is executed to reenter all dimensions in the selected row of the (L) array 75.

If no corrections are to be made, or if no further corrections are to be made, the system branches in the opposite direction at the decision block 104. As indicated by process blocks 106 and 107, instructions are then executed which ask the operator through the display 3 whether or not the contents of the (L) array 75 are to be reprinted. If so, a loop indicated by an arrow 108 is established by a decision block 109. After the part has been completely and accurately described by the contents of the (L) array 75, the main routine proceeds to the process block 110 in FIG. 8.

Figure 8:
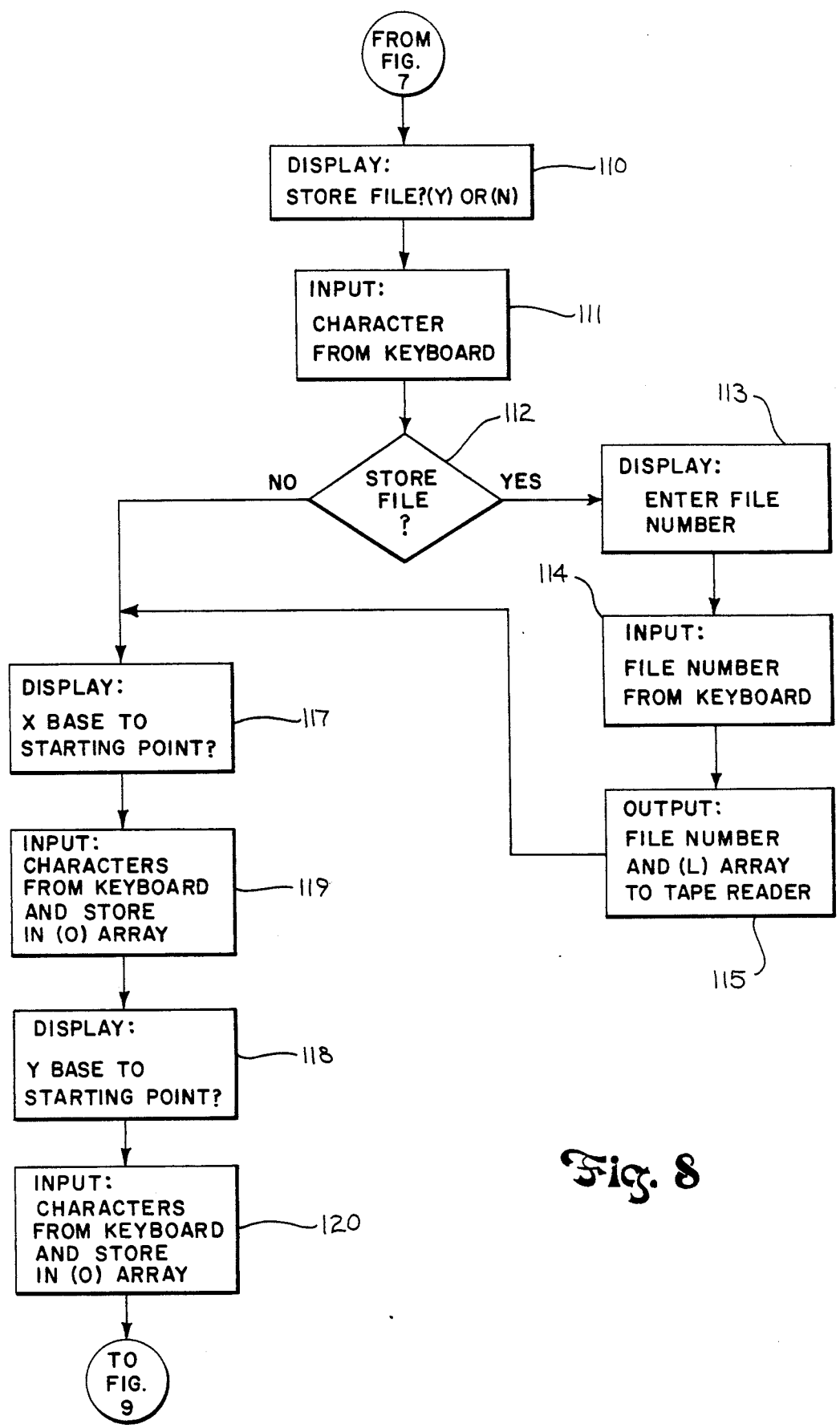
Figure 9:
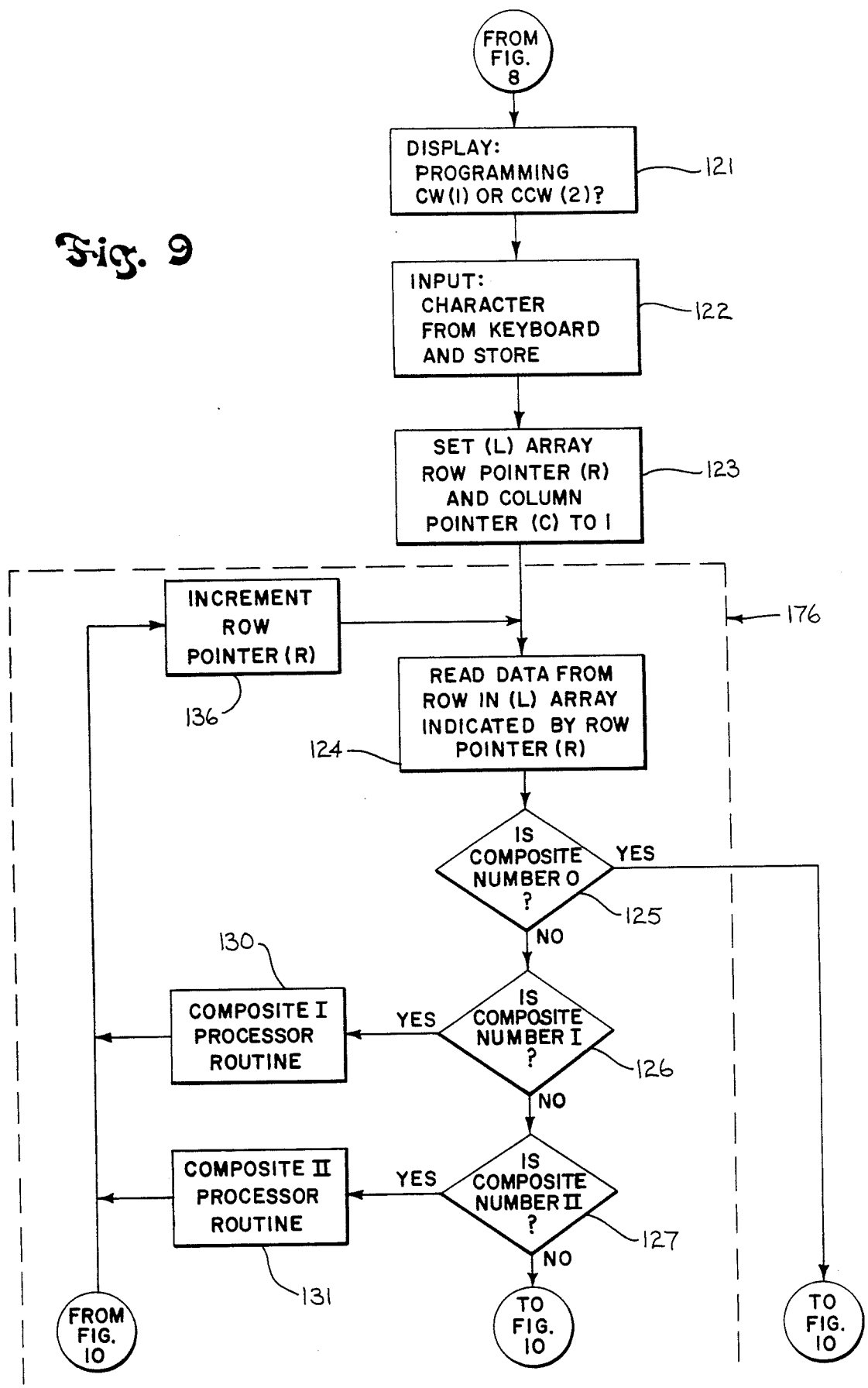
Figure 10:
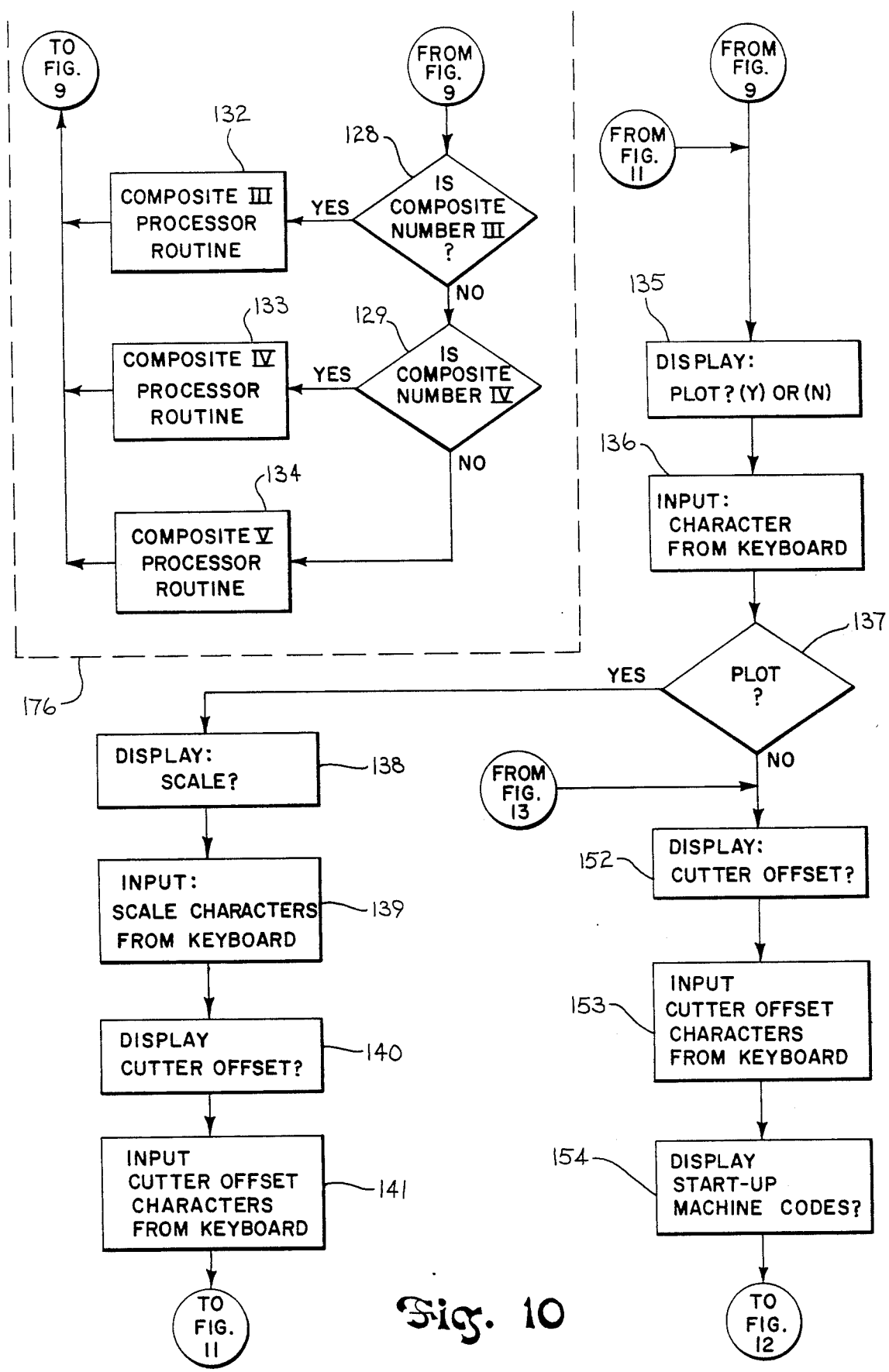

Referring particularly to FIG. 8, an instruction indicated by the process block 110 outputs data to the display 3 which asks the operator whether or not the developed data file stored in the (L) array 75 is to be stored in the tape cassette 2. The operator's response is inputted from the keyboard 1 as indicated by process block 111 and if the file is to be stored, the system branches at a decision block 112 to a process block 113. The instruction indicated by the process block 113 outputs data to the alpha-numeric display 3 which asks the operator to enter the number of the data file stored in the (L) array 75. The response is received from the keyboard 1 as indicated by a process block 114 and the indicated file number along with the contents of the (L) array 75 are then outputted to the tape cassette 2 by means of instructions indicated by a process block 115. This completes the generation of a geometric definition of the part according to the present invention and subsequent steps in the procedure are employed to convert this definition into a part program of standard form which may be employed on a commercially numerically controlled machine to reproduce the part.

The definition of the part stored in the (L) array 75 is a very concise definition in that it does not require a great deal of memory space. It is also a convenient form in which to store the definition of a part since it can be easily altered when changes are to be made in the part. Before the part can be reproduced on a commercially available numerically controlled machine, however, the form of the definition must be converted to data which is understood by such a machine. In other words, it must be converted into a standard format and code which defines the part as a series of moves to be made by the machine.

Referring to FIGS. 2 and 18, an (O) array 116 is stored in the main memory 10. The (O) array 116 includes a plurality of rows, each of which includes five locations for storing data that defines a move to be made by the machine. Each location in a row is identified by a column number 1-5. The element in column 1 of each row in the (O) array 116 is a move code which is referred to in the art as a "G" code. The "G" codes are indicated in TABLE B.

TABLE B

| G Code | Description |
| --- | --- |
| 9 | Cut a straight line from the present position to the indicated position. |
| 2 | Cut a circular arc in the clockwise direction about an indicated center and from the present position to an indicated position. |
| 3 | Cut a circular arc in the counterclockwise direction about an indicated center and from the present position to an indicated position. |

The elements in columns 2 and 3 of each row in the (O) array are the respective X and Y coordinate values of the end point of the indicated move. The elements in columns 4 and 5 in each row are the respective X and Y coordinate values of the center point about which a circular arc is to be cut. By convention the latter two elements are referred to as the "I" and "J" values. It is a function of the invented programmer unit to convert the definition of the part which is stored in its (L) array 75 into a series of moves which are stored in successive rows of the (O) array 116.

Referring again to the flow chart of the executive routine in FIG. 8, the first step in this conversion process is to request from the operator the absolute coordinate values of the starting point of the machining process. This is accomplished by a set of instructions indicated by process blocks 117 and 118. The response from the operator is stored in the (O) array 116 as the endpoints of a first straight line move by a set of instructions indicated by process blocks 119 and 120.

As indicated by a process block 121, the operator is next asked to indicate whether the part is described in the (L) array 75 as a series of composites which travel clockwise or counterclockwise around the perimeter of the part. The response is received from the keyboard 1 and stored in the memory 10 for later use as indicated by a process block 122. An (L) array row pointer (R) and column pointer (C) are then set to "one" as indicated by process block 123 and a loop indicated by dashed line 176 is then entered in which the data on each row of the (L) array 75 is converted to a series of moves which are stored on successive rows of the (O) array 116.

Data is first read from the indicated row in the (L) array 75 into a temporary storage area as indicated by a process block 124. The composite number associated with this row is then determined by a set of instructions indicated by respective decision blocks 125-129 and the system branches either to one of the corresponding composite processor routines 130-134, or it branches out of the loop to a process block 135 shown in FIG. 10. As will be described in more detail hereinafter, the composite processor routines 130-134 are each associated with a respective composite I-V and each converts the data on the indicated row of the (L) array 75 to a series of moves which are stored on successive lines in the (O) array 116. After the appropriate composite processor routine 130-134 is executed, the system returns to a process block 136 shown in FIG. 9 which increments the row pointer (R) and loops back to the process block 124. The process of converting each row of the (L) array 75 to data stored in the (O) array 116 continues until the composite number "zero" is detected at the decision block 125. The end of the part description is thus indicated and the system branches to the process block 135 in FIG. 10. As will be described in more detail hereinafter, the functions performed within the loop defined by dashed line 176 are governed by a program identified as the "composite processor routine."

An instruction indicated by the process block 135 outputs data to the alpha-numeric display 3 which asks the operator whether or not the part defined by the data in the (O) array 116 is to be generated on the X-Y plotter 40. The operator's response is inputted from the keyboard 1 by an instruction indicated by process block 136. The response is analyzed by instructions indicated by a decision block 137. If a plot is to be made, the system branches to an instruction indicated by process block 138 which asks the operator to indicate the scale at which the part is to be reproduced. The responsive data is inputted from the keyboard by an instruction indicated by process block 139 and then the operator is asked to indicate the cutter offset by an instruction indicated by process block 140. The cutter offset characters are inputted from the keyboard 1 by instructions indicated by process block 141 and then instructions indicated by process block 142 are executed to set an (O) array row counter (RO) and column counter (CO) to "one."

Figure 11:
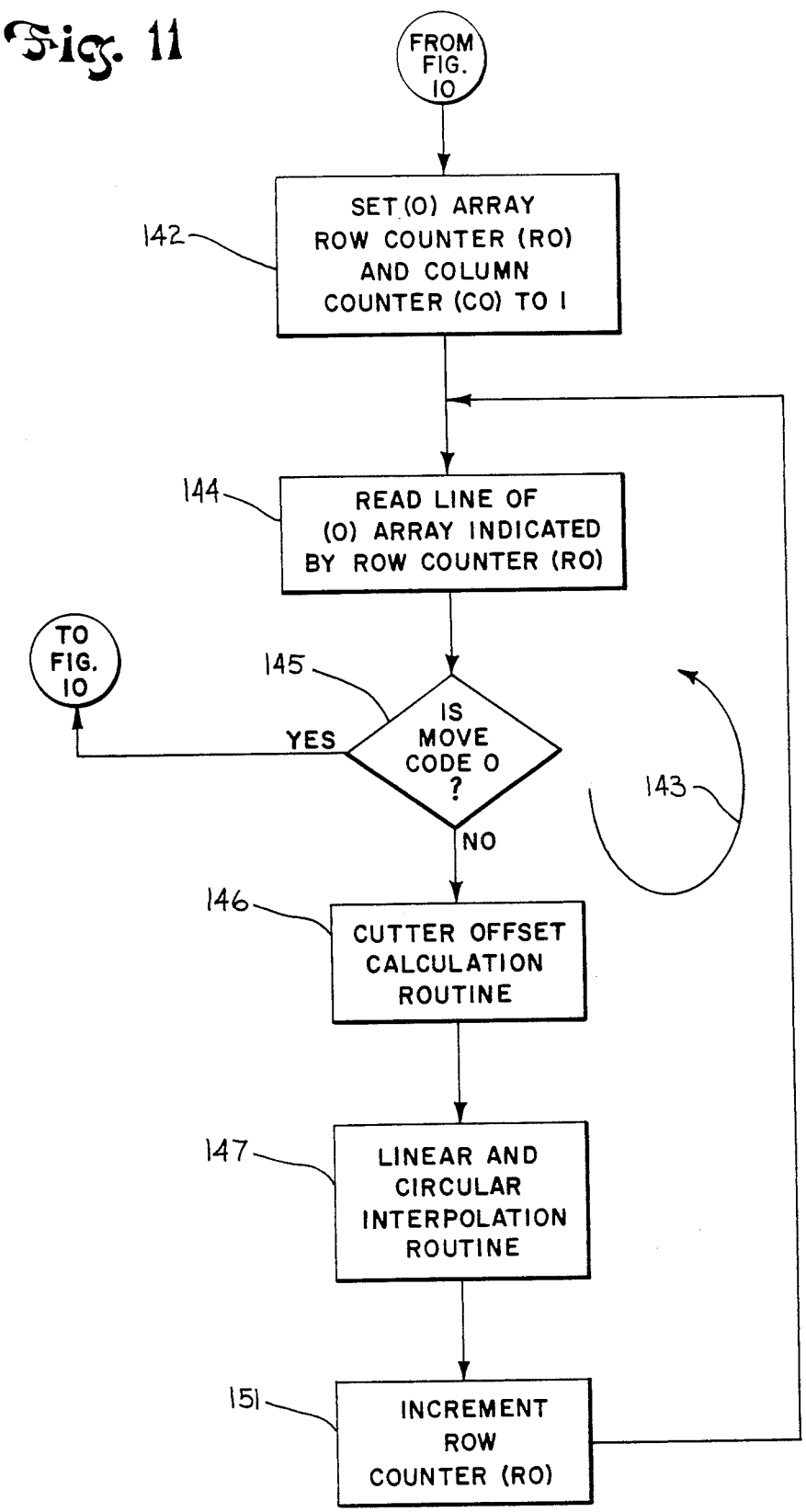

Referring to FIG. 11, a loop indicated by an arrow 143 is then entered in which the move indicated by each line of the (O) array 116 is translated to output data for the X-Y plotter 40 to control its X and Y servomechanisms. More specifically, the data on the indicated row of the (O) array 116 is read out and stored in temporary registers by instructions indicated by a process block 144. The move code "G" is then analyzed by instructions indicated by process block 145. The move code "zero" indicates the part has been completed and in response to its presence, the system branches back to the process block 135 in FIG. 10. Otherwise, either a straight line or circular move is to be made.

As indicated by process block 146 calculations are then made to alter the contents of the (O) array 116 to reflect the indicated cutter offset. This is accomplished by a cutter offset calculation routine which examines the move codes and elements on three successive lines of the (O) array 116 to calculate the offset elements of one line. Such routines are well known in the art and the routine 146 employed herein is listed in Appendix A. After calculating the offset values of the move, a circular or linear interpolation routine indicated by process block 147 is executed to generate command data to the plotter 40. The interpolation routine 147 is listed in Appendix B. At the end of the indicated move an instruction indicated by process block 151 is executed to increment the row counter (R) and the system loops back to the process block 144 to analyze and execute the next move stored in the (O) array 116.

Referring again to FIG. 10, if no further plots are to be made, the system does not branch at the decision block 137 and an instruction indicated by process block 152 is executed to ask the operator to input cutter offset. An instruction indicated by process block 153 inputs the cutter offset characters from the keyboard 1 and the operator is then asked to input any start-up machine codes as indicated by process block 154.

Figure 12:
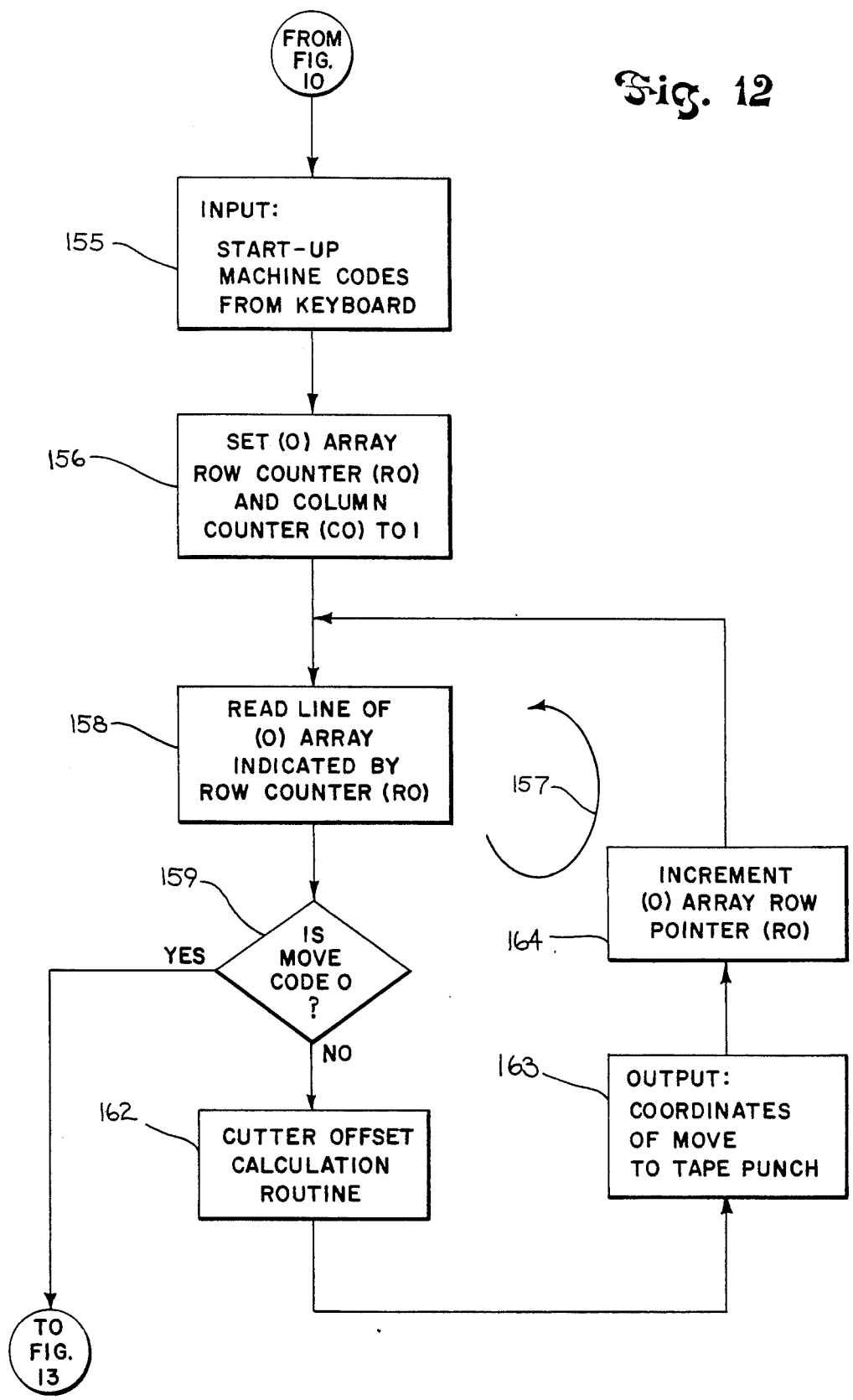
Figure 13:
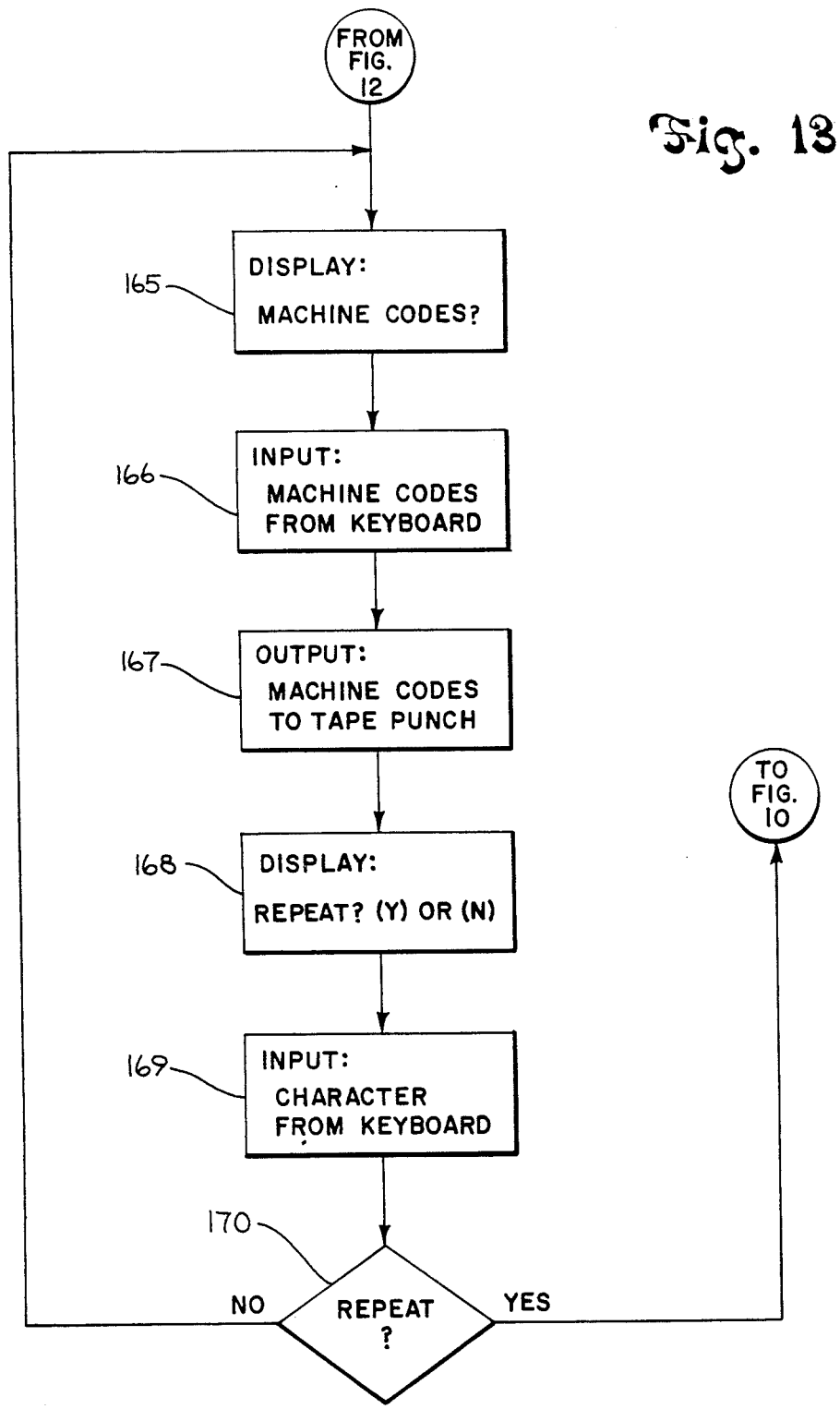

Referring to FIG. 12, these start-up machine codes are inputted from the keyboard 1 and stored in temporary registers as indicated by process block 155. The (O) array row counter (RO) and column counter (CO) are set to "one" by instructions indicated as process block 156. A loop indicated by an arrow 157 is then entered in which the elements of the (O) array 116 are changed to reflect cutter offset. The data on the indicated line of the (O) array 116 is written into a temporary register as indicated by process block 158 and then the move code is identified as indicated by decision block 159. As indicated by process block 162, if the move code is a "nine", a "two" or a "three", the CUTTER offset calculation routine described above and listed in Appendix A is called up and executed. The resulting altered elements of the move command along with the move code are coupled to the tape punch 41 by a set of instructions indicated by process block 163. The (O) array row pointer (RO) is then incremented as indicated by process block 164 and the system loops back to read out the next line of the (O) array 116. When the move code "zero" is detected, the entire part program has been developed and the system branches at the decision block 159 to FIG. 13.

The last step in the development of the part program stored in punched tape is to enter any machine codes which are to follow the cutting of the part. More specifically, an instruction indicated by process block 165 outputs data to the alpha-numeric display 3 which instructs the operator that machine codes may be entered. Sets of instructions indicated by process blocks 166 and 167 input any such machine codes from the keyboard 1 and output the same to the tape punch 41. Because it is often desirable to repeat the part program, an instruction indicated by process block 168 is executed to output data to the alpha-numeric display 3 which asks whether or not the part program stored in the (O) array 116 is to be repeated. The responsive characters are inputted from the keyboard 1 as indicated by process block 169 and analyzed by instructions indicated by decision block 170. If the part program is not to be repeated the system loops back to process block 165, otherwise, the system loops back to the process block 152 in FIG. 10 to repeat the conversion of (O) array data to final form. For example, a tool change might be made, a new cutter offset entered and the part program repeated to perform a finishing cut.

As indicated above, the programmer unit interacts with the operator to load the data into the (L) array 75 which defines the part in terms of a series of composites. As described with reference to FIGS. 5 and 6, the operator is asked to identify the composite number and the programmer unit them calls up the appropriate composite routine 93-97. The composite routines 93-97 include instructions which interrogate the operator through the alpha-numeric display 3. These interrogations are requests for the operator to enter through the keyboard 1 geometric data which specifically defines the selected composite. The composite routines 93-97 input this geometric data from the keyboard 1 and store it along with the associated composite number in the (L) array 75.

Although in concept there is a separate composite routine 93-97 for each of the selectable composites I-V, in practice a single program with appropriately placed jump instructions is employed because it is shorter and hence requires less memory space. This routine which was identified above as the "combined composite routine," is as follows:

COMBINED COMPOSITE ROUTINE

```
190    DISP "COMPOSITE NUMBER";
200    INPUT F5
210    L[R,1] = F5                Store Composite Number
                                  in Column 1 of indicated
                                  row of (L) array.

Figure 6:
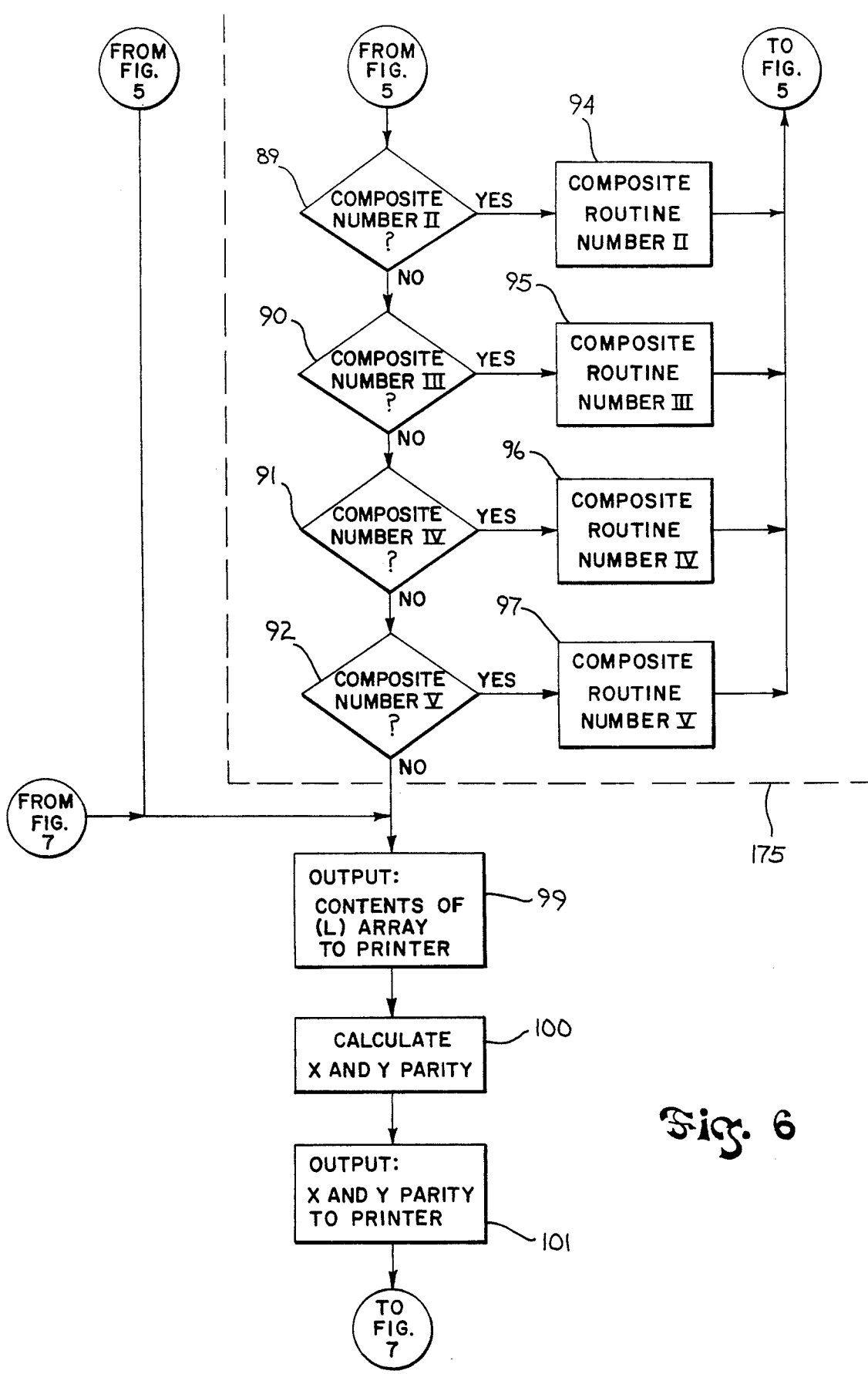

220    IF L[R,1] = 0 550          If the composite number
                                  is zero, jump to process
                                  block 99 (Fig. 6).

230    DISP "X";                  Output "X" to display 3
240    INPUT G                    and input operator response
                                  from keyboard 1 and store
                                  in G.

250    L[R,2] = G                 Store X coordinate in
                                  column 2 of indicated row
                                  of (L) array.

270    DISP "Y";                  Output "Y" to display 3
280    INPUT H                    and input operator response
                                  from keyboard 1 and store
                                  in H.
290    L[R,3] = H                 Store Y coordinate in
                                  column 3 of indicated row
                                  of (L) array.
```

| | | | |
|---|---|---|---|
| 310 | IF L[R,1] = 1 THEN 520 | | If composite number is 1, jump to process block 98 (Fig. 5). |
| 320 | DISP "R1"; | | Output "R1" to display 3 and input operator response from keyboard 1 and store in N. |
| 330 | INPUT N | | |
| 340 | L[R,4] = N | | Store radius of first circle in column 4 of indicated row in (L) array. |
| 360 | DISP "R2"; | | Output "R2" to display 3 and input operator response from keyboard 1 and store in F. |
| 370 | INPUT F | | |
| 380 | L[R,5] = F | | Store radius of second circle in column 5 of indicated row in (L) array. |
| 400 | IF F5=2 OR F5=5 THEN 490 | | If the composite number 2 or 5, jump to 490. |
| 410 | DISP "R3"; | | Output "R3" to display 3 and input operator response from keyboard 1 and store in F1. |
| 420 | INPUT F1 | | |
| 450 | L[R,6] = F1 | | Store radius of connecting circle in column 6 of indicated row of (L) array. |
| 490 | DISP "ROT OF R1 AND R2"; | | Output "ROT OF R1 AND R2" to display 3 and input operator response from keyboard 1 and store in column 7 of indicated row of (L) array. |
| 500 | INPUT L[R,7] | | |
| 540 | GOTO 190 | | Jump to process block 98 (Fig. 5). |

As described above with reference to the flow chart of FIGS. 9 and 10, the composite numbers and associated geometric data stored in each row of the (L) array 75 is converted by composite processor routines into a series of moves which are stored on successive lines of the (O) array 116. Although in concept there is a separate composite processor routine for each of the selectable composites I-V, in practice a single program identified above as the "COMPOSITE PROCESSOR ROUTINE" is employed to process all of the composite numbers. This routine in turn employs a number of subroutines which are also used for all of the composites. The COMPOSITE PROCESSOR ROUTINE along with the "SUBROUTINE FOR CALCULATING TANGENCY POINTS (A,B,C,D) AND CENTER OF CONNECTING CIRCLE (I,J)", "(O) ARRAY MOVE STORAGE SUBROUTINE," and the "SUBROUTINE FOR CALCULATING 0, 90, 180 AND 270 DEGREE COORDINATES BETWEEN ESTABLISHED TANGENCY POINTS ON A CIRCLE" which it employs are as follows:

COMPOSITE PROCESSOR ROUTINE

| | | |
|---|---|---|
| 160 | R0=3 | If the first column in the indicated row of the (L) array is zero then the end of program is indicated. |
| 170 | R7=1 | |
| 180 | R=R+1 | |
| 210 | IF L[R,1]=0 THEN 2360 | |
| 220 | GOSUB 2430 | Jump to SUBROUTINE FOR CALCULATING TANGENCY POINTS (A,B,C,D) AND CENTER OF CONNECTING CIRCLE (I,J). |

```
240   IF R7=1 THEN 640              If at starting point
                                    on part, jump to 640.

---------------------------

250   IF Z3=9 THEN 490
260   X3=1
270   IF N=0 THEN 340
280   V1=A
290   U1=V1+U6
300   V2=B
310   U2=V2+U7
320   U5=N
330   GOTO 1040                     Identify subtype
340   X3=2                          number, call up
350   V3=C                          SUBROUTINE FOR
360   U3=V3+U6+G                    CALCULATING 0, 90,
370   V4=D                          180 and 270 DEGREE
380   U4=V4+U7+H                    COORDINATES BETWEEN
390   IF N=0 THEN 480               ESTABLISHED TANGENCY
400   G5=VAL(G$[3])                 POINTS ON A CIRCLE,
410   W1=G5                         and call up (O) ARRAY
420   W2=U1                         MOVE STORAGE SUBROUTINE.
430   W3=U2                         After each composite
440   W4=U6                         (i.e. row of the (L)
450   W5=U7                         array) is processed
470   GOSUB 2402                    into a series of moves
480   IF Z3>2 AND Z3<9 THEN 890     stored in successive
490   V6=G                          rows of the (O) array,
500   U6=U6+V6                      the routine loops back
510   V7=H                          to increment the (L)
520   U7=U7+V7                      array row counter (R)
530   U3=V3+U6                      at memory location 180.
540   U4=V4+U7
550   IF Z3=10 OR Z3=11 THEN 180
560   S5=VAL(S$[3])
570   W1=S5
580   W2=U3
590   W3=U4
600   W4=0
602   W5=0
610   GOSUB 2402
620   R7=2
630   GOTO 180

---------------------------

640   V1=A
650   U1=U1+V1+X8
660   V2=B
670   U2=U2+V2+Y8
680   V3=C
690   U3=U3+V3+G+X8
700   V4=D
710   U4=U4+V4+H+Y8
720   V6=G
730   U6=U6+V6+X8                   Load coordinate
740   V7=H                          values of starting
750   U7=U7+V7+Y8                   point into (O)
760   S5=VAL(S$[3])                 array.
770   O[R0,1]=S5
780   O[R0,2]=U1
790   O[R0,3]=U2
800   R0=R0+1
810   S5=VAL(S$[3])
820   W1=S5
830   W2=U3
840   W3=U4
850   W4=0
852   W5=0
860   GOSUB 2402
870   R7=2
880   GOTO 180

---------------------------
```

SUBROUTINE FOR CALCULATING TANGENCY POINTS (A,B,C,D) AND CENTER OF CONNECTING CIRCLE (I,J)

```
2430  Z3=L[R,1]                              Assign a
2460  G=L[R,2]                               variable name
2470  H=L[R,3]                               to each of the
2480  N=L[R,4]                               seven elements
2490  F=L[R,5]                               in the indicated
2500  F1=L[R,6]                              row of the (L)
2510  Z2=L[R,7]                              array.

-----------------------------

2520  IF Z2=11 OR Z2=12 THEN 2550            Test for circle
                                             directions.

-----------------------------

2530  G$="G03"                               Store proper
2540  GOTO 2560                              machine code in
2550  G$="G02"                               G$.

-----------------------------

2560  Z6=0
2580  Z6=Z3

-----------------------------

2590  IF Z3=1 THEN 3040                      Identify the
2600  IF Z3=2 THEN 2660                      composite number
2610  IF Z3=3 THEN 2680                      and jump to indicated
2630  IF Z3=4 THEN 2730                      memory address.

-----------------------------

Figure 19:
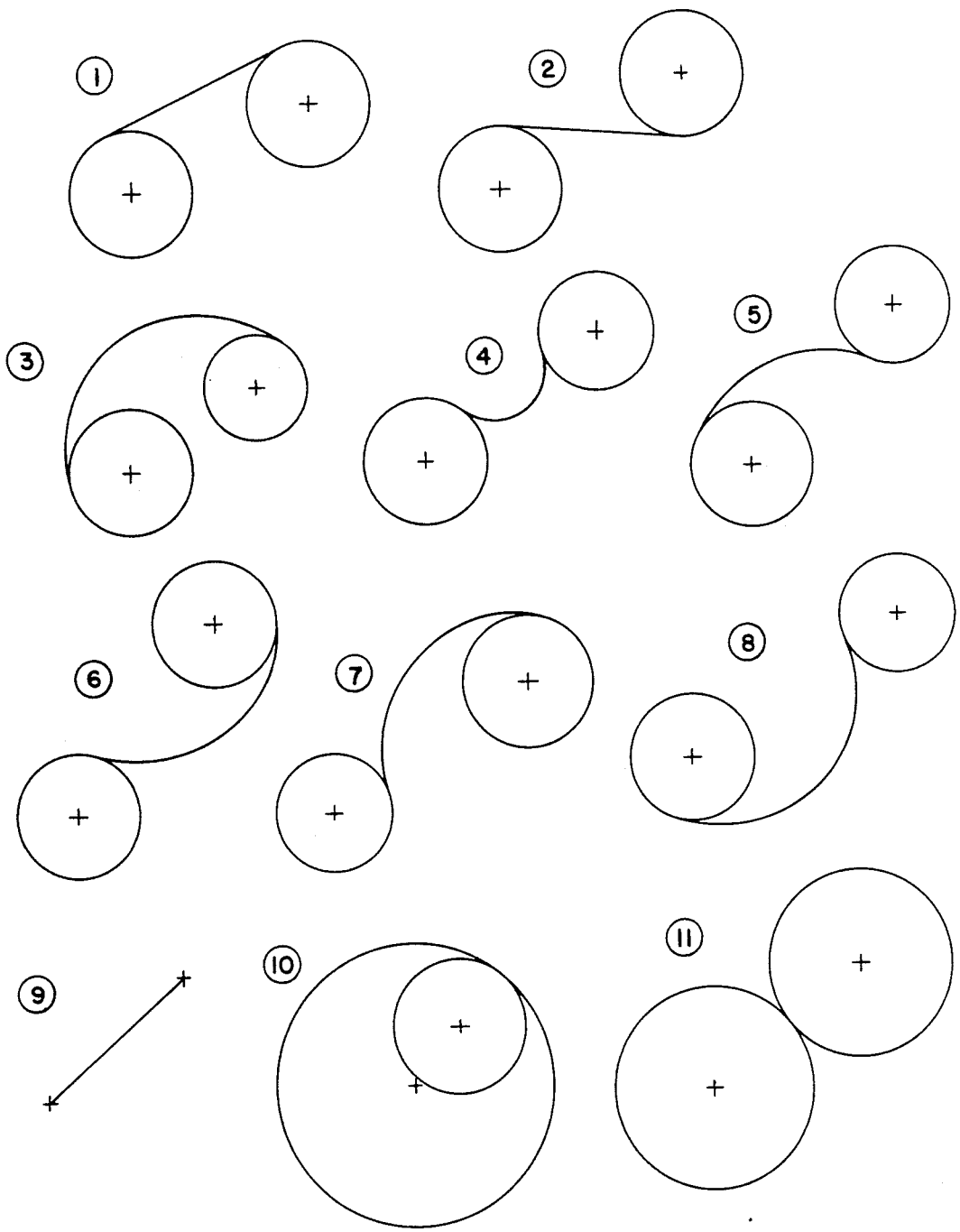
FIG. 19 is an illustration of the eleven subtypes into which the five composites of FIG. 15 are broken in order to facilitate calculations.

2640  IF Z2=11 OR Z2=22 THEN 3080
2650  GOTO 3060
2660  IF Z2=11 OR Z2=22 THEN 2820
2670  GOTO 2840                              Identify the
2680  IF Z2=12 OR Z2=21 THEN 2880            subtype 1-11
2700  GOTO 2860                              (See Fig. 19).
2710  IF Z2=11 OR Z2=22 THEN 2860
2720  GOTO 2880
2750  IF Z2=11 THEN 2900
2760  IF Z2=12 THEN 2920
2770  IF Z2=21 THEN 2940
2780  IF Z2=22 THEN 2960
2810  GOTO 3060

-----------------------------

2820  Z3=1
2830  GOTO 3140
2840  Z3=2
2850  GOTO 3140
2860  Z3=3
2870  GOTO 3140
2880  Z3=4
2890  GOTO 3140                              Store identified
2900  Z3=5                                   subtype number
2910  GOTO 3140                              in Z3 and jump to
2920  Z3=6                                   memory address 3140.
2930  GOTO 3140
2940  Z3=7
2950  GOTO 3140
2960  Z3=8
2970  GOTO 3140
3040  Z3=9
3050  GOTO 3140
3060  Z3=10
3070  GOTO 3140
3080  Z3=11

-----------------------------
```

```
                                        Assign function
                                        and variable names
                                        to common formulas.

3140    Z2=1
3150    DEF FNA(X)=(T^2+(F+N)^2-(F+F1)^2)/(2T(F+N+E8))
3160    Z4=1
3170    DEF FNB(Y)=(T^2+(F1+F)^2-(F+N)^2)/(2T(F1+F+E8))
3180    DEF FNC(X)=(T^2+(N-F)^2-(F1+F)^2)/(2T(N-F+E8))
3190    DEF FND(Y)=(T^2+(F1+F)^2-(N-F)^2)/(2T(F1+F+E8))
3200    DEF FNE(K)=ATN(H/(G+E8))+2SGN(H+E8)*ATNE9*(G<0)
3210    DEF FNG(G)=ATN(H/(G+E8))+2SGN(H+E8)*ATNE9*
            (G<0)-ATN(S/SQR(1-S^2+E8))
3220    DEF FNH(H)=ATN(H/(G+E8))+2SGN(H+E8)*ATNE9*
            (G<0)+ATN(S/SQR(1-S^2+E8))
3230    DEF FNX(X)=ATN(SQR(1-X^2)/(X+E8))+2ATNE9*(X<0)
3240    DEF FNY(Y)=ATN(SQR(1-Y^2)/(Y+E8))+2ATNE9*(Y<0)
3250    E8=1E-90
3260    E9=1E+90
3270    T=SQR(G^2+H^2)

---------------------------

3280    IF Z3=2 THEN 3530              Identify and
3290    IF Z3>2 AND Z3<9 THEN 3670     jump to proper
3310    IF Z3=9 THEN 4360              subtype calculation
3320    IF Z3=10 OR Z3==11 THEN 4380   routine.

---------------------------

3330    L=0
3340    S=(N-F)/T
3350    IF Z2=2 THEN 3390
3360    G$="G02"
3370    S=-S
3380    GOTO 3400                      Calculate
3390    G$="G03"                       values for A,B,
3400    GOSUB 3480                     C and D for
3410    IF Z2=1 THEN 3450              subtype 1.
3420    B=-B
3430    D=-D
3440    GOTO 4590
3450    A=-A
3460    C=-C
3470    GOTO 4590
3480    K=ATN(G/(H+E8))+2SGN(G+E8)*ATNE9*
            (H<0)-ATN(S/SQR(1-S^2+E8))
3490    GOSUB 4730
3500    C=F*COSK
3510    D=F*SINK
3520    RETURN

---------------------------

3670    K=FNE(K)
3680    IF Z3=3 AND Z2=2 OR Z3=4 AND Z2=1 AND N>0
            OR Z3=8 THEN 3710
3690    IF Z3=4 AND N=0 AND Z2=2 OR Z3=6 THEN 3710
3700    K=-K
3710    IF Z3=4 OR Z3=6 OR Z3=7 THEN 3730
3720    N=-N
3730    IF Z3=4 OR Z3=5 OR Z3=8 THEN 3750
3740    F1=-F1
3750    X=FNA(X)
3760    L=FNX(X)
3770    GOSUB 4730
3780    Y=FNB(Y)                       Calculate values
3790    L1=FNY(Y)                      for A,B,C,D,I
3800    IF Z3=6 THEN 3830              and J for subtypes
3810    L1=-L1                         3-8.
3820    K=-K
3830    GOSUB 4760
3840    IF Z3=6 THEN 3860
3850    K=-K
3860    F=-F
```

```
3870  GOSUB 4790
3880  IF Z3=3 THEN 3920
3890  IF Z3=4 THEN 3950
3900  IF Z3=6 THEN 4030
3910  IF Z3=7 THEN 4010
3920  IF Z2=2 OR Z3=8 THEN 4050
3930  IF Z3=3 AND Z2=1 AND N=0 AND G<0 THEN 4000
3940  GOTO 4010
3950  IF N>0 AND Z2=1 OR N=0 AND Z2=2 THEN 4050
3960  IF Z2=1 AND G>0 AND N=0 THEN 4020
3970  IF Z2=1 AND G>0 THEN 4050
3980  IF Z2=2 THEN 4010
3990  A=-A
4000  I=-I
4010  B=-B
4020  J=-J
4030  D=-D
4040  IF N=0 AND G<0 AND Z2=1 THEN 4290
4300  GOSUB 4570
4310  C9=A-1
4320  D9=B-J
4330  A9=C+G-I
4340  B9=D+H-J
4350  GOTO 4540
```

----

```
4360  A=B=C=D=0                          Calculate values of A,
4370  RETURN                             B,C and D for subtype 9.
```

----

```
4380  IF Z2=1 THEN 4410
4390  G$="G03"
4400  GOTO 4420
4410  G$="G02"
4420  A=(N*G)/T
4430  B=(N*H)/T                          Calculate values
4440  C=-(F*G)/T                         of A,B,C and D
4450  D=-(F*H)/T                         for subtypes 10 and 11.
4460  IF Z3=10 THEN 4530
4470  IF Z3=11 AND N>F THEN 4510
4480  A=-A
4490  B=-B
4500  GOTO 4530
4510  C=-3
4520  D=-D
4530  GOTO 4590
```

----

```
4540  F=ABS(F)
4550  F1=ABS(F1)
4560  N=ABS(N)
4570  J=(INT(J*10000+0.5))/10000
4580  I=(INT(I*10000+0.5))/10000
4590  H=(INT(H*10000+0.5))/10000
4600  G=(INT(G*10000+0.5))/10000         Subroutine for
4610  D=(INT(D*10000+0.5))/10000         rounding off values
4620  C=(INT(C*10000+0.5))/10000         of A,B,C,D,G,H,I and
4630  B=(INT(B*10000+0.5))/10000         J to four decimal
4640  A=(INT(A*10000+0.5))/10000         places.
4650  IF Z4=2 THEN 4720
4670  IF Z2=1 THEN 4700
4680  Z2=1
4690  GOTO 4710
4700  Z2=2
4710  Z4=2
4720  RETURN
```

----

```
4730  A=N*COS(L+K)
4740  B=N*SIN(K+L)                       Subroutines em-
4750  RETURN                             ployed in calculating
4760  C=-F1*COS(L1-K)                    values of A,B,C,D,I
4770  D=F1*SIN(L1-K)                     and J.
```

```
4780  RETURN
4790  I=(N-F)*COS(L+K)
4800  J=(N-F)*SIN(L+K)
4810  RETURN
```

------------------------------

(O) ARRAY MOVE STORAGE SUBROUTINE

```
2402  O[R0,1]=W1
2404  O[R0,2]=W2
2406  O[R0,3]=W3
2408  O[R0,4]=W4
2410  O[R0,5]=W5
2412  IF O[R0-1,2]=W2 AND O[R0-1,3]=W3 OR L[R,1]=0 THEN 2416
2414  R0=R0+1
2416  RETURN
```

SUBROUTINE FOR CALCULATING 0, 90, 180
AND 270 DEGREE COORDINATES BETWEEN ESTABLISHED
TANGENCY POINTS ON A CIRCLE

```
890   IF Z3=4 AND N>0 OR Z3=6 THEN 910
900   GOTO 920
910   IF X3=2 AND Z2=1 THEN 970
920   IF Z3=3 OR Z3=8 THEN 990
930   IF Z3=4 AND N=0 AND Z2=2 THEN 970
940   G$="G02"
950   Z2=1
960   GOTO 990
970   G$="G03"
980   Z2=2
990   V3=C9
1000  V4=D9
1010  V1=A9
1020  V2=B9
1030  U5=F
1040  IF V3=0 AND V4>0 THEN 1120
1050  IF V3>0 AND V4>0 THEN 1140
1060  IF V3>0 AND V4=0 THEN 1160
1070  IF V3>0 AND V4<0 THEN 1180
1080  IF V3=0 AND V4<0 THEN 1200
1090  IF V3<0 AND V4<0 THEN 1220
1100  IF V3<0 AND V4=0 THEN 1240
1110  IF V3<0 AND V4>0 THEN 1260
1120  E=1
1130  GOTO 1270
1140  E=2
1150  GOTO 1270
1160  E=3
1170  GOTO 1270
1180  E=4
1190  GOTO 1270
1200  E=5
1210  GOTO 1270
1220  E=6
1230  GOTO 1270
1240  E=7
1250  GOTO 1270
1260  E=8
1270  IF V1=0 AND V2>0 THEN 1350
1280  IF V1>0 AND V2>0 THEN 1370
1290  IF V1>0 AND V2=0 THEN 1390
1300  IF V1>0 AND V2<0 THEN 1410
1310  IF V1=0 AND V2<0 THEN 1430
1320  IF V1<0 AND V2<0 THEN 1450
1330  IF V1<0 AND V2=0 THEN 1470
1340  IF V1<0 AND V2>0 THEN 1490
1350  T=1
1360  GOTO 1500
1370  T=2
```

```
1380    GOTO 1500
1390    T=3
1400    GOTO 1500
1410    T=4
1420    GOTO 1500
1430    T=5
1440    GOTO 1500
1450    T=6
1460    GOTO 1500
1470    T=7
1480    GOTO 1500
1490    T=8
1500    IF Z2=2 THEN 1610
1510    IF E=1 AND T>3 THEN 1710
1520    IF E=2 AND T>3 OR E=2 AND T=1 OR E=2 AND
            T=2 AND V1<V3 THEN 1710
1530    IF E=3 AND T>5 OR E=3 AND T<3 THEN 1750
1540    IF E=4 AND T>5 OR E=4 AND T<4 OR E=4 AND
            T=4 AND V1>V3 THEN 1750
1550    IF E=5 AND T>7 OR E=5 AND T<5 THEN 1790
1560    IF E=6 AND T>7 OR E=6 AND T<6 OR E=6 AND
            T=6 AND V1>V3 THEN 1790
1570    IF E=7 AND T#8 AND E=7 AND T#1 THEN 1830
1580    IF E=8 AND T=8 AND V1<V3 OR E=8 and T>1
            AND T#8 THEN 1830
1590    IF X3=2 THEN 2190
1600    GOTO 340
1610    IF E=1 AND T<7 THEN 1790
1620    IF E=2 AND T>2 OR E=2 AND T=2 AND V1>V3
            THEN 1830
1630    IF E=3 AND T>3 THEN 1830
1640    IF E=4 AND T<3 OR E=4 AND T>4 OR E=4 AND
            T=4 AND V1<V3 THEN 1710
1650    IF E=5 AND T<3 OR E=5 and T>5 THEN 1710
1660    IF E=6 AND T<5 OR E=6 AND T>6 OR E=6 AND
            T=6 AND V1<V3 THEN 1750
1670    IF E=7 AND T<5 OR E=7 AND T>7 THEN 1750
1680    IF E=8 AND T<7 OR E=8 AND T=8 AND V1>V3
            THEN 1790
1690    IF X3=2 THEN 2190
1700    GOTO 340
1710    IF X3=2 THEN 1970
1720    V3=U6+U5
1730    V4=U7
1740    GOTO 1860
1750    IF X3=2 THEN 2000
1760    V3=U6
1770    V4=U7-U5
1780    GOTO 1860
1790    IF X3=2 THEN 2030
1800    V3=U6-U5
1810    V4=U7
1820    GOTO 1860
1830    IF X3=2 THEN 2060
1840    V3=U6
1850    V4=U7+U5
1860    G5=VAL(G$[3])
1870    W1=G5
1880    W2=V3
1890    W3=V4
1900    W4=U6
1910    W5=U7
1930    GOSUB 2402
1940    V3=V3-U6
1950    V4=V4-U7
1960    GOTO 1040
1970    V3=U6+U5+I
1980    V4=U7+J
1990    GOTO 2080
2000    V3=U6+I
2010    V4=U7-U5+J
2020    GOTO 2080
2030    V3=U6-U5+I
2040    V4=U7+J
2050    GOTO 2080
2060    V3=U6+I
```

```
2070  V4=U7+U5+J
2080  G5=VAL(G$[3])
2090  W1=G5
2100  W2=V3
2110  W3=V4
2120  W4=U6+I
2130  W5=U7+J
2150  GOSUB 2402
2160  V3=V3-U6-I
2170  V4=V4-U7-J
2180  GOTO 1040
2190  V3=C
2200  U3=V3+U6+G
2210  V4=D
2220  U4=V4+U7+H
2230  IF N=0 AND Z3=1 THEN 490
2240  G5=VAL(G$[3])
2250  W1=G5
2260  W2=U3
2270  W3=U4
2280  W4=U6+I
2290  W5=U7+J
2310  GOSUB 2402
2320  U6=U6+G
2330  U7=U7+H
2340  R7=2
2350  GOTO 180
2360  W1=0[4,1]
2370  W2=0[4,2]
2380  W3=0[4,3]
2390  W4=0[4,4]
2392  W5=0[4,5]
2394  GOSUB 2402
```

---

APPENDIX A

CUTTER OFFSET CALCULATION ROUTINE

```
650  K1=0[N,1]
660  K2=0[N+1,1]
670  A1=0[N,2]
680  A2=0[N-1,2]
690  A3=0[N+1,2]
700  B1=0[N,3]
710  B2=0[N-1,3]
720  B3=0[N+1,3]
730  I1=0[N,4]
740  I2=0[N+1,4]
750  J1=0[N,5]
760  J2=0[N+1,5]
770  IF R9#0 OR S9#0 THEN 860
780  IF N>3 THEN 860
790  A1=0[T5-1,2]
800  B1=0[T5-1,3]
810  K1=0[T5-1,1]
820  I1=0[T5-1,4]
830  J1=0[T5-1,5]
840  A2=0[T5-2,2]
850  B2=0[T5-2,3]
860  IF K2=0 THEN 3060
870  IF K1=1 AND K2=1 THEN 930
880  IF K1=2 AND K2=2 THEN 2370
890  IF K1=3 AND K2=3 THEN 2560
900  IF K1=2 AND K2=3 THEN 2370
910  IF K1=3 AND K2=2 THEN 2560
920  GOTO 1230
930  IF N=3 AND R9#0 OR N=3 AND S9#0 THEN 1110
940  IF N=T5-1 AND R9#0 OR N=T5-1 AND S9#0 THEN 1170
950  A=A1-A2
```

```
960   B=B1-B2
970   IF N=T5-1 THEN 1010
980   C=A3-A1
990   D=B3-B1
1000  GOTO 1030
1010  C=O[4,2]-A1
1020  D=O[4,3]-B1
1030  IF N>3 THEN 1060
1040  A=A1-O[T5-2,2]
1050  B=B1-O[T5-2,3]
1060  K=FNA(K)
1070  L=FNB(L)
1080  X=A1-(O/SIN((K-180+1E-08-L)/2))*SIN(-(K+L)/2)
1090  Y=B1-(O/SIN((K-180+1E-08-L)/2))*COS(-(K+L)/2)
1100  GOTO 2750
1110  C=A3-A1
1120  D=B3-B1
1130  L=FNB(L)
1140  X=A1-O*SINL
1150  Y=B1+O*COSL
1160  GOTO 2750
1170  A=A1-A2
1180  B=B1-B2
1190  K=FNA(K)
1200  X=A1-O*SINK
1210  Y=B1+O*COSK
1220  GOTO 2750
1230  IF K2=2 AND N=3 THEN 2370
1240  IF K2=3 AND N=3 THEN 2560
1250  IF K1=2 OR K1=3 THEN 1310
1260  A=B1-B2
1270  B=A1-A2
1280  C=B1-J2
1290  D=I2-A1
1300  GOTO 1350
1310  A=B1-B3
1320  B=A1-A3
1330  C=B1-J1
1340  D=I1-A1
1350  K=ATN(B/(A+1E-90))
1360  L=ATN(D/(C+1E-90))
1370  M=K+L
1380  IF M>0 THEN 1400
1390  M=-M
1400  IF M>89 AND M<91 THEN 2220
1410  IF Z5=2 THEN 1440
1420  O=-O
1430  IF M>90 OR M<-90 THEN 1460
1440  K=FNA(K)
1450  GOTO 1470
1460  K=ATN(B/(A+1E-90))+2*SGN(B-1E-90)*ATN1E+90*(A<0)
1470  L=FNB(L)
1480  M=K+L
1490  IF M<-270 THEN 1510
1500  GOTO 1520
1510  M=M+360
1520  IF M<270 THEN 1540
1530  M=360-M
1540  IF K1=2 OR K1=3 THEN 1640
1550  IF M>90 OR M<-90 THEN 1590
1560  G=I2-A2
1570  H=J2-B2
1580  GOTO 1610
1590  G=-(I2-A2)+2*(A1-A2)
1600  H=-(J2-B2)+2*(B1-B2)
1610  F=SQR((A1-I2)↑2+(B1-J2)↑2)
1620  K=90-K
1630  GOTO 1740
1640  IF M>90 OR M<-90 THEN 1680
1650  G=A3-I1
1660  H=B3-J1
1670  GOTO 1700
1680  G=2*(A1-A3)-(I1-A3)
1690  H=2*(B1-B3)-(J1-B3)
1700  F=SQR((A1-I1)↑2+(B1-J1)↑2)
1710  K=90-K
```

```
1720 IF M>90 OR M<-90 THEN 1740
1730 K=K+180
1740 IF K1=1 THEN 1810
1750 Z2=K1
1760 IF Z5=2 AND Z2=3 OR Z5=1 AND Z2=2 THEN 1780
1770 O=-O
1780 IF M<-90 AND Z2=2 THEN 1860
1790 IF M<-90 AND Z2=3 OR M<90 AND Z2=2 OR M>90 AND Z2=3
     THEN 1940
1800 GOTO 1860
1810 Z2=K2
1820 IF Z5=2 AND Z2=3 OR Z5=1 AND Z2=2 THEN 1840
1830 O=-O
1840 IF M<-90 AND Z2=3 THEN 1860
1850 IF M<-90 AND Z2=2 OR M<90 AND Z2=3 OR M 90 AND
     Z2=2 THEN 1940
1860 K=K+1E-04
1870 T1=0-(G*TANK-H)*COSK
1880 T1=T1+(1E-05)*(T1 <= 0)
1890 M1=ATN((SQR(1-(T1/(F-0))↑2))/(T1/(F- 0) +1E-90))+2*
     ATN1E+90*(T1/(F-0)<0)
1900 L=K+M1-90
1910 G3=G+(F-0)*COSL
1920 H1=H+(F=0)*SINL
1930 GOTO 2030
1940 IF K<0 THEN 1970
1950 K=K-1E-08
1960 GOTO 1980
1970 K=K+1E-08
1980 Z=G*TANK
1990 X=(0-(H-Z)*COSK)/(F-0)
2000 L=ATN(X/SQR(1-X↑2+1E-90))
2010 G3=G+(F-0)*COS(K+L)
2020 H1=H+(F-0)*SIN(K+L)
2030 IF K1=1 THEN 2090
2040 G3=G-G3
2050 H1=H-H1
2060 X=I1+G3
2070 Y=J1+H1
2080 GOTO 2150
2090 IF<M -90 THEN 2110
2100 IF M <= 90 OR M=-90 THEN 2130
2110 G3=2*(A1-A2)-G3
2120 H1=2*(B1-B2)-H1
2130 X=A2+G3
2140 Y=B2+H1
2150 IF Z5=2 THEN 2170
2160 O=-O
2170 IF Z5=2 and Z2=3 OR Z5=:. AND Z2=2 THEN 2190
2180 O=-O
2190 IF K1=1 AND K2=2 OR K1=:. AND K2=3 THEN 2750
2200 IF K1=2 AND K2=1 THEN 2420
2210 IF K1=3 AND K2=1 THEN 2610
2220 IF K1=1 AND K2=3 THEN 2310
2230 IF K1=2 AND K2=1 THEN 2370
2240 IF K1=3 AND K2=1 THEN 2560
2250 A=A1-I2
2260 B=B1-J2
2270 H=SQR(A↑2+B↑2)
2280 X=I2+(A*(H+0))/(H+1E-90)
2290 Y=J2+(B*(H+0))/(H+1E-90)
2300 GOTO 2750
2310 A=I2-A1
2320 B=J2-B1
2330 H=SQR(A↑2+B↑2)
2340 X=I2-(A*(H-0))/H
2350 Y=J2-(B*(H-0))/H
2360 GOTO 2750
2370 R=I1-A1
2380 S=J1-B1
2390 Q=FNC(Q)
2400 X=I1-(R*(Q+0))/Q
2410 Y=J1-(S*(Q+0))/Q
2420 IF N=3 THEN 2750
2430 GOSUB 3850
```

```
2560  R=I1-A1
2570  S=B1-J1
2580  Q=FNC(Q)
2590  X=I1-(R*(Q-0))/Q
2600  Y=J1+(S*(Q-0))/Q
2610  IF N=3 THEN 2750
2620  GOSUB 3850

3850  X=X+X9
3860  Y=Y+Y9
3870  I1=I1+X9
3880  J1=J1+Y9
3890  RETURN
```

From the above listings it should be apparent that the five composites I–V are broken down into eleven subtypes. These subtypes are illustrated generally in FIG. 19 and it can be seen that composite II is broken into two subtypes (1 and 2), composite III is broken into two subtypes (3 and 4), composite IV is broken into four subtypes (5–8), and composite V is broken into two subtypes (10 and 11). In most instances the subtypes are distinguished by the direction of travel (cw or ccw) around the respective circles. The reason for establishing the subtypes is that the formulas for calculating the tangency points at which the connecting line intersects the circles differs for each.

Figure 20A:
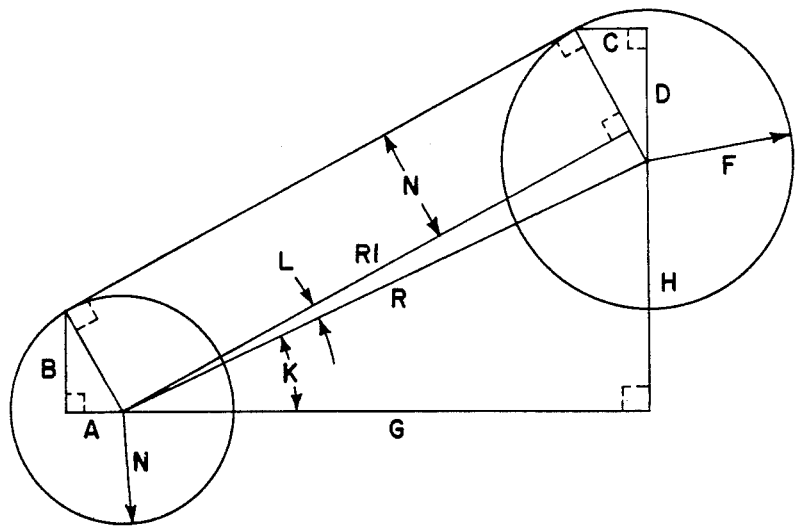
FIG. 20a and 20b are illustrations of the variables involved in calculating elements of the (O) array.
Figure 20B:
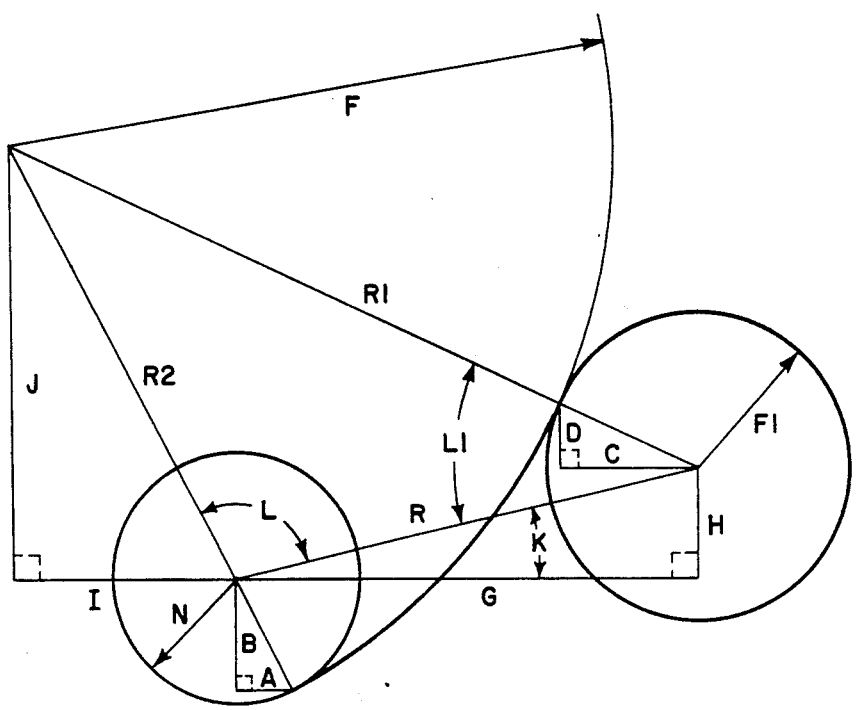

In order to convert the composite numbers and associated geometric data into a series of moves, the coordinate values of the tangency points at which the connecting line intersects the circles must be calculated for all but composite I. In the case of composites III and IV the coordinate values of the center of the connecting circle must also be calculated. These calculations are made by the above listed SUBROUTINE FOR CALCULATING TANGENCY POINTS (A, B, C, D) AND CENTER OF CONNECTING CIRCLE (I, J). To better understand how these calculations are performed reference is made to FIGS. 20a and 20b in which the variables employed in this subroutine are shown as they apply to a subtype 1 and a subtype 2 geometry. The dimensions for G and H as well as the radii N, F and F1 are given (i.e. they are elements of the (L) array).

A programmer unit has been described in which a processor is programmed to interact through an alphanumeric display and a keyboard with an operator to develop a part program for a numerically controlled machine. It should be apparent to those skilled in the art, however, that a hardwired processor may also be employed to perform the same functions. It should also be apparent that portions or all of the components of the invented programmer unit may be included as an integral part of a numerical control system. In such case the processor, (L) array and (O) array storage means of the present invention may be an integral part of the numerical control processor and memory or they may be a separate microprocessor and associated memory device or devices. These and other variations may be made without deviating from the spirit of the invention and reference is, therefore, made to the following claims for a definition of the invention.

APPENDIX B

LINEAR AND CIRCULAR
INTERPOLATION ROUTINE

```
2440  IF P$="T" THEN 2470
2450  GOSUB 3380
2460  GOTO 2940
2470  GOSUB 3960
2480  REM GOSUB 4020
2490  WRITE (15,22) "N",N3," G02 X",X/10000," Y",Y/10000,"
      I",ABS(I1-X5)/10000;
2500  WRITE (15,24)" J",ABS(J1-Y5)/10000
2510  OUTPUT (2,26)"N",N3,"G02","X",X,"Y",Y;"I",ABS(I1-X5),
      "J",ABS(J1-Y5)
2530  X5=X
2540  Y5=Y
2550  GOTO 2940

2630  IF P$="T" THEN 2660
2640  GOSUB 3380
2650  GOTO 2940
2660  GOSUB 3960
2670  REM GOSUB 4020
2680  WRITE (15,22)"N",N3," G03 X",X/10000," Y",Y/10000,
```

```
                " I",ABS(I1-X5)/10000;
2690    WRITE (15,24)" J",ABS(J1-Y5)/10000
2700    OUTPUT (2,26)"N",N3,"GO3","X",X,"Y";Y;"I",ABS
        (I1-X5),"J",ABS(J1-Y5)
2720    X5=X
2730    Y5=Y
2740    GOTO 2940
2750    IF N=T5-2 AND K1=2 THEN 2420
2760    IF N=T5-2 AND K1=3 THEN 2610
2770    GOSUB 3850
2780    IF P$="T" THEN 2810
2790    GOSUB 3380
2800    GOTO 2940
2810    GOSUB 3960
2820    REM GOSUB 4020
2830    WRITE (15,22)"N",N3" GO1 X",X/10000," Y",Y/10000
2840    IF X=X5 THEN 2880
2850    IF Y=Y5 THEN 2900
2860    OUTPUT (2,26)"N",N3,"GO1","X",X,"Y",Y
2870    GOTO 2920
2880    OUTPUT (2,26)"N",N3,"GO1","Y",Y
2890    GOTO 2920
2900    OUTPUT (2,26)"N",N3,"GO1","X",X
2920    X5=X
2930    Y5=Y
2940    N3=N3+1
2950    IF 0[T5-2,2]=0[T5-1,2] AND 0[T5-2,3]=0[T5-1,3] THEN 2980
2960    IF 0[N+2,1]=0 THEN 3020
2970    GOTO 2990
2980    IF 0[N+3,1]=0 THEN 3020
2990    N=N+1
3000    NEXT I
3020    PRINT
3030    PRINT
3040    W9=2
3050    IF P$="P" THEN 40
3060    DISP "ENTER NEW CODES            ";
3070    INPUT T$
3080    REM  IF T$="M30" THEN 3910
3090    IF T$="0" THEN 3190
3100    REM GOSUB 4020
3140    WRITE (15,3150)"N",N3,T$
3150    FORMAT F4.0,F2.0
3160    OUTPUT (2,26)"N",N3,T$
3180    N3=N3+1
3182    GOTO 3060
3190    DISP "OFFSET, SHIFT ST.PT.(88)";
3200    INPUT O
3210    O1=0
3220    IF O=99 THEN 3110
3230    IF O=88 THEN 3250
3240    GOTO 3310
3250    DISP "SHIFT STARTING POINT   X";
3260    INPUT X9
3270    DISP "SHIFT STARTING POINT   Y";
3280    INPUT Y9
3290    PRINT "SHIFT IN STARTING POINT  X=";X9;"Y=";Y9
3300    GOTO 40
3310    PRINT "OFFSET=";O
3320    IF Z5=1 THEN 3340
3330    O=-O
3340    N3=N3+1
3350    N=3
3360    GOTO 630
3370    END
3380    IF N=3 THEN 3400
3390    IF K1=2 OR K1=3 THEN 3460
3400    X1=X
3410    Y1=Y
3420    WRITE (705,3430)"PA",(P8+X*S0)*1016,",",(Q8+Y*S0)*1016
3430    FORMAT 2F7.0
3440    WRITE (705,*)"PD"
3450    RETURN
3460    X2=X
3470    Y2=Y
3480    R=SQR((X1-I1)↑2+(Y1-J1)↑2)
```

```
3490  K=ATN((Y1-J1)/((X1-I1)+1E-90))+2*SGN((Y1-J1)+1E-90)*
      ATN1E+90*((X1-I1)<0)
3500  T=ATN((Y2-J1)/((X2-I1)+1E-90))+2*SGN((Y2-J1)+1E-90)*
      ATN1E+90*((X2-I1)<0)
3510  K=(INT(K*100000))/100000
3520  T=(INT(T*100000))/100000
3530  IF K >= 0 AND T >= 0 OR K <= 0 AND T <= 0 THEN 3570
3540  IF K>0 AND T<0 AND K1=3 THEN 3710
3550  IF K>0 AND T<0 AND K1=2 OR K<0 AND T>0 AND
      K1=3 THEN 3750
3560  IF K<0 AND T>0 AND K1=2 THEN 3740
3570  IF K<0 AND T=0 AND K1=2 THEN 3630
3580  IF K=0 AND T>0 AND K1=2 THEN 3650
3590  IF K>0 AND T=0 AND K1=3 THEN 3610
3600  GOTO 3660
3610  T=360
3620  GOTO 3660
3630  T=-360
3640  GOTO 3660
3650  K=360
3660  S1=(T-K)/10
3670  IF K1=3 AND T>0 AND K>T THEN 3710
3680  IF K1=2 OR K1=3 AND T >= 0 OR K1=2 AND T<0 OR
      T<0 AND K1=3 THEN 3760
3690  S1=-S1
3700  GOTO 3760
3710  T=360+T
3720  S1=(T-K)/10
3730  GOTO 3760
3740  K=360+K
3750  S1=(T-K)/10
3760  IF K=T THEN 3820
3770  FOR A=K TO T STEP S1
3780  A0=R*COSA+I1
3790  B0=R*SINA+J1
3800  WRITE (705,3430)"PA",(P8+A0*S0)*1016,",",
      (Q8+B0*S0)*1016
3810  NEXT A
3820  X1=X2
3830  Y1=Y2
3840  RETURN

3900  LINK 1,10,930
3910  WRITE (15,3920)T$
3920  FORMAT F2.0
3930  OUTPUT (2,3940,A)T$
3940  FORMAT F1002.0
3950  END
3960  X=INT(X*10000+0.5)
3970  Y=INT(Y*10000+0.5)
3980  I1=INT(I1*10000+0.5)
3990  J1=INT(J1*10000+0.5)
4000  IF X=X5 AND Y=Y5 THEN 2940
4010  RETURN
```

I claim:

1. A programmer unit for developing a part program for a numerical control system, the combination comprising:

a memory for storing a plurality of multi-bit words, including a portion designated as an (L) array and a portion designated as an (O) array;

data bus means coupled to said memory means for writing data into selected locations in said memory and for reading data out of selected locations in said memory;

alpha-numeric display means coupled to the data bus means, said display means being operable in response to selected data on said data bus means to display messages for an operator;

keyboard means coupled to the data bus means, said keyboard means being operable in response to manual operations by the operator to generate data to the data bus means; and processor means coupled to said data bus means and being operable to read program instructions out of said memory means and in response thereto perform a plurality of functions which comprise:

coupling data to said display means which generates a message prompting the operator to select and enter one of a plurality of selectable composite numbers;

coupling data from the keyboard means which represents a selected composite number to a location in the (L) array portion of said memory;

coupling data to said display means which generates a message prompting the operator to enter a set of geometric data which is associated with the previously selected composite number;

coupling data from the keyboard means which represents the set of geometric data to locations in the (L) array portion of said memory; and sequentially reading the composite numbers and associated geometric data out of said (L) array portion of said memory and converting each into a set of move codes and associated geometric data which are stored in the (O) array portion of said memory.

2. The programmer unit as recited in claim 1 in which a part program storage means is coupled to said data bus means and said processor means functions to sequentially couple the contents of the (O) array portion of said memory to said part program storage means.

3. The programmer unit as recited in claim 1 in which a plotter is coupled to said data bus means and said processor means functions to sequentially read out the move codes and associated geometric data from the (O) array portion of said memory and in response thereto generate command data which is coupled to the plotter to control its servomechanisms through a series of moves.

4. A programmer unit for developing a part program for a numerical control system, the combination comprising:

a memory for storing a plurality of multi-bit words, including a portion designated as an (L) array which stores a plurality of composite numbers and associated geometric data and a portion designated as an (O) array which stores a plurality of move codes and associated geometric data;

data bus means coupled to said memory means for writing data into selected locations in said memory and for reading data out of selected locations in said memory;

alpha-numeric display means coupled to the data bus means, said display means being operable in response to selected data on said data bus means to display messages for an operator;

keyboard means connected to the data bus means, said keyboard means being operable in response to manual operations by the operator to generate data to the data bus means; and processor means coupled to said data bus means and being operable to read program instructions out of said memory means and in response thereto perform a plurality of functions which comprise:

coupling data from the keyboard means which represents a selected composite number and storing it in a location in the (L) array portion of said memory;

coupling data from the keyboard means which represents a set of geometric data associated with said selected composite number and storing the same in locations in the (L) array portion of said memory; and sequentially reading the composite numbers and their associated geometric data out of said (L) array portion of said memory and converting each into a set of move codes and associated geometric data which are stored in the (O) array portion of said memory.

5. The programmer unit as recited in claim 4 in which each of said composite numbers is associated with a specific class of geometric shapes and the geometric data associated with each composite number defines a specific geometric shape within the class of possible geometric shapes.

6. The programmer unit as recited in claim 5 in which said move codes include:

a straight line move code in which the geometric data associated therewith defines the location of the end point of a straight line move; and a circular move code in which the geometric data associated therewith defines the location of the end point of a circular move and the location of the center of the circle about which the circular move is to be made.

7. The programmer unit as recited in claim 6 in which said processor means functions in response to at least one of said selectable composite numbers read from said (L) array to convert it and its associated geometric data into a circular move code and associated geometric data, a straight line move code and associated geometric data and a second circular move code and associated geometric data.

8. The programmer unit as recited in claim 7 in which said processor means functions in response to at least one other of said selectable composite numbers read from said (L) array to convert it and its associated geometric data into a series of three circular move codes and their associated geometric data.

9. The programmer unit as recited in claim 8 in which said processor means functions in response to at least one other of said selectable composite numbers read from said (L) array to convert it and its associated geometric data into a series of two circular move codes and their associated geometric data.

10. The programmer unit as recited in claim 6 which includes means for coupling said data bus means to the servomechanisms on a machine and in which said processor means functions to read out straight line move codes and their associated geometric data stored in the (O) array portion of said memory, generate command data therefrom and output it to said servomechanisms; and said processor means also functions to read out circular move codes and their associated geometric data stored in the (O) array portion of said memory, generate command data therefrom and output it to said servomechanisms.

11. A programmer unit for developing a part program for a numerical control system, the combination comprising:

a memory for storing a plurality of multi-bit words, including a portion designated as an (L) array and a portion designated as an (O) array;

data bus means coupled to said memory means for writing data into selected locations in said memory and for reading data out of selected locations in said memory;

I/O control unit means connected to said data bus means for receiving data therefrom and coupling data thereto, said I/O control unit means being connectable to a plurality of I/O devices through I/O data bus means;

alpha-numeric display means connected to the I/O control unit through said I/O data bus means, said display means being operable in response to selected data on said I/O data bus means to display messages for an operator;

keyboard means connected to the I/O control unit through said I/O data bus means, said keyboard means being operable in response to manual operations by the operator to generate data to the I/O control unit means; and processor means coupled to said data bus means and being operable to read program instructions out of said memory means and in response thereto perform a plurality of functions which comprise:

coupling data to said display means which generates a message prompting the operator to select and enter one of a plurality of selectable composite numbers;

coupling data from the keyboard means which represents a selected composite number to a location in the (L) array portion of said memory;

coupling data to said display means which generates a message prompting the operator to enter a set of geometric data which is associated with the previously selected composite number;

coupling data from the keyboard means which represents the set of geometric data to locations in the (L) array portion of said memory;

sequentially reading the composite numbers and associated geometric data out of said (L) array portion of said memory and converting each into a set of move codes and associated geometric data which are stored in the (O) array portion of said memory.

12. The programmer unit as recited in claim 11 in which a part program storage means is coupled to said I/O control unit means and said processor means functions to sequentially couple the contents of the (O) array portion of said memory to said part program storage means.

13. The programmer unit as recited in claim 11 in which a plotter is coupled to said I/O control unit means and said processor means functions to sequentially read out the move codes and associated geometric data from the (O) array portion of said memory and in response thereto generate command data which is coupled to the plotter to control its servomechanisms through a series of moves.

* * * * *